US012500956B2

(12) United States Patent
Seed et al.

(10) Patent No.: US 12,500,956 B2
(45) Date of Patent: *Dec. 16, 2025

(54) END-TO-END M2M SERVICE LAYER SESSIONS

(71) Applicant: InterDigital Patent Holdings, Inc., Wilmington, DE (US)

(72) Inventors: Dale N. Seed, Allentown, PA (US); Lijun Dong, San Diego, CA (US); Guang Lu, Ontario (CA); Michael F. Starsinic, Newtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,086

(22) Filed: Apr. 7, 2023

(65) Prior Publication Data

US 2023/0247014 A1    Aug. 3, 2023

Related U.S. Application Data

(63) Continuation of application No. 17/400,561, filed on Aug. 12, 2021, now Pat. No. 11,765,150, which is a
(Continued)

(51) Int. Cl.
*H04L 9/40*    (2022.01)
*H04L 67/10*    (2022.01)
(Continued)

(52) U.S. Cl.
CPC .............. *H04L 67/14* (2013.01); *H04L 63/08* (2013.01); *H04L 67/10* (2013.01); *H04L 67/141* (2013.01);
(Continued)

(58) Field of Classification Search
CPC ..... H04W 12/033; H04W 12/06; H04W 4/70; H04W 4/60; H04W 76/10; H04W 12/04;
(Continued)

(56) References Cited

U.S. PATENT DOCUMENTS 934,888 A    9/1909   Dahlberg
5,610,653 A    3/1997   Abecassis
(Continued)

FOREIGN PATENT DOCUMENTS

CN    101313578 A    11/2008
CN    101331735 A    12/2008
(Continued)

OTHER PUBLICATIONS

"Lightweight Machine to Machine Technical Specification," (LWM2MSpecification), Open Mobile Alliance (OMA), Approved Version 1.0, Feb. 8, 2017, pp. 1-138.
(Continued)

*Primary Examiner* — Mohammad A Siddiqi
(74) *Attorney, Agent, or Firm* — Flaster Greenberg, P.C.

(57) ABSTRACT

Mechanisms support machine-to-machine service layer sessions that can span multiple service layer hops where a machine-to-machine service layer hop is a direct machine-to-machine service layer communication session between two machine-to-machine service layer instances or between a machine-to-machine service layer instance and a machine-to-machine application. Mechanisms are also disclosed that illustrate machine-to-machine session establishment procedures for oneM2M Session Management Service supporting multiple resources.

20 Claims, 23 Drawing Sheets

Related U.S. Application Data continuation of application No. 16/691,765, filed on Nov. 22, 2019, now Pat. No. 11,122,027, which is a continuation of application No. 14/341,479, filed on Jul. 25, 2014, now Pat. No. 10,530,757.

(60) Provisional application No. 61/858,387, filed on Jul. 25, 2013, provisional application No. 61/886,787, filed on Oct. 4, 2013.

(51) Int. Cl.

| | | |
|---|---|---|
| *H04L 67/14* | (2022.01) | |
| *H04L 67/141* | (2022.01) | |
| *H04L 67/142* | (2022.01) | |
| *H04L 69/321* | (2022.01) | |
| *H04W 4/60* | (2018.01) | |
| *H04W 4/70* | (2018.01) | |
| *H04W 12/033* | (2021.01) | |
| *H04W 12/06* | (2021.01) | |
| *H04W 76/10* | (2018.01) | |
| *H04L 67/12* | (2022.01) | |
| *H04L 67/56* | (2022.01) | |
| *H04W 12/02* | (2009.01) | |
| *H04W 12/04* | (2021.01) | |

(52) U.S. Cl.
CPC .......... *H04L 67/142* (2013.01); *H04L 69/321* (2013.01); *H04W 4/60* (2018.02); *H04W 4/70* (2018.02); *H04W 12/033* (2021.01); *H04W 12/06* (2013.01); *H04W 76/10* (2018.02); *H04L 63/0428* (2013.01); *H04L 63/062* (2013.01); *H04L 67/12* (2013.01); *H04L 67/56* (2022.05); *H04W 12/02* (2013.01); *H04W 12/04* (2013.01)

(58) Field of Classification Search
CPC ...... H04W 12/02; H04L 67/141; H04L 67/10; H04L 69/321; H04L 67/14; H04L 67/142; H04L 63/08; H04L 67/12; H04L 67/56; H04L 69/18; H04L 69/08; H04L 63/062; H04L 63/0428
See application file for complete search history.

(56) References Cited

U.S. PATENT DOCUMENTS

| | | | |
|---|---|---|---|
| 5,892,554 A | 4/1999 | Dicicco et al. | |
| 6,750,919 B1 | 6/2004 | Rosser | |
| 6,973,130 B1 | 12/2005 | Wee et al. | |
| 7,114,174 B1 | 9/2006 | Brooks et al. | |
| 7,117,517 B1 | 10/2006 | Milazzo et al. | |
| 7,343,617 B1 | 3/2008 | Katcher et al. | |
| 7,483,409 B2 | 1/2009 | Zheng | |
| 7,539,175 B2 | 5/2009 | White et al. | |
| 7,577,980 B2 | 8/2009 | Kienzle et al. | |
| 7,782,344 B2 | 8/2010 | Whittaker | |
| 7,870,267 B2* | 1/2011 | Gilfix .................... | H04L 67/14 |
| | | | 709/227 |
| 7,895,345 B2 | 2/2011 | Manion et al. | |
| 7,949,032 B1 | 5/2011 | Frost | |
| 8,055,785 B2 | 11/2011 | Liu et al. | |
| 8,160,077 B2 | 4/2012 | Traversat et al. | |
| 8,224,885 B1 | 7/2012 | Doucette et al. | |
| 8,243,797 B2 | 8/2012 | Lin et al. | |
| 8,331,760 B2 | 12/2012 | Butcher | |
| 8,355,407 B2 | 1/2013 | Wookey et al. | |
| 8,358,614 B2 | 1/2013 | Pani et al. | |
| 8,621,000 B2 | 12/2013 | Adimatyam et al. | |
| 8,705,527 B1 | 4/2014 | Addepalli et al. | |
| 9,020,556 B2 | 4/2015 | Haim et al. | |
| 9,047,236 B2 | 6/2015 | Gigliotti | |
| 9,049,042 B2 | 6/2015 | Tagg et al. | |
| 9,060,187 B2 | 6/2015 | Wu et al. | |
| 9,064,313 B2 | 6/2015 | Seshadrinathan et al. | |
| 9,078,141 B2 | 7/2015 | Hwang | |
| 9,137,027 B2 | 9/2015 | Matthews et al. | |
| 9,170,707 B1 | 10/2015 | Laska et al. | |
| 9,177,225 B1 | 11/2015 | Cordova-Diba et al. | |
| 9,215,075 B1 | 12/2015 | Poltorak | |
| 9,231,838 B2 | 1/2016 | Ould-Brahim et al. | |
| 9,288,545 B2 | 3/2016 | Hill et al. | |
| 9,317,688 B2 | 4/2016 | Yegin et al. | |
| 9,336,060 B2 | 5/2016 | Nori et al. | |
| 9,344,888 B2 | 5/2016 | Starsinic et al. | |
| 9,380,623 B2 | 6/2016 | Kim et al. | |
| 9,510,190 B2 | 11/2016 | Zhang et al. | |
| 9,756,031 B1 | 9/2017 | Roth et al. | |
| 9,811,541 B2* | 11/2017 | Revanuru .............. | G06F 16/252 |
| 9,992,553 B2 | 6/2018 | Bennett et al. | |
| 10,110,595 B2 | 10/2018 | Choyi et al. | |
| 10,200,353 B2* | 2/2019 | Seed .................... | H04W 12/033 |
| 10,530,757 B2* | 1/2020 | Seed .................... | H04W 76/10 |
| 11,122,027 B2 | 9/2021 | Seed et al. | |
| 2002/0065678 A1 | 5/2002 | Peliotis et al. | |
| 2002/0120931 A1 | 8/2002 | Huber et al. | |
| 2002/0126990 A1 | 9/2002 | Rasmussen et al. | |
| 2002/0174425 A1 | 11/2002 | Markel et al. | |
| 2003/0074580 A1* | 4/2003 | Knouse ............... | H04L 63/0815 |
| | | | 726/4 |
| 2004/0025018 A1 | 2/2004 | Haas et al. | |
| 2004/0032495 A1 | 2/2004 | Ortiz | |
| 2004/0190779 A1 | 9/2004 | Sarachik et al. | |
| 2005/0027870 A1 | 2/2005 | Trebes | |
| 2005/0030951 A1 | 2/2005 | Maciocco et al. | |
| 2005/0058094 A1 | 3/2005 | Lazaridis et al. | |
| 2005/0093976 A1 | 5/2005 | Valleriano et al. | |
| 2005/0286466 A1 | 12/2005 | Tagg et al. | |
| 2006/0155842 A1 | 7/2006 | Yeung et al. | |
| 2006/0193295 A1 | 8/2006 | White et al. | |
| 2007/0024706 A1 | 2/2007 | Brannon et al. | |
| 2007/0042784 A1 | 2/2007 | Anderson | |
| 2007/0086669 A1 | 4/2007 | Berger et al. | |
| 2007/0097885 A1* | 5/2007 | Traversat ............... | H04L 61/50 |
| | | | 370/254 |
| 2007/0101418 A1 | 5/2007 | Wood et al. | |
| 2007/0104369 A1 | 5/2007 | Weatherhead | |
| 2007/0140106 A1 | 6/2007 | Tsai et al. | |
| 2007/0153739 A1 | 7/2007 | Zheng | |
| 2007/0171921 A1 | 7/2007 | Wookey et al. | |
| 2008/0127253 A1 | 5/2008 | Zhang et al. | |
| 2008/0134305 A1 | 6/2008 | Hinton et al. | |
| 2008/0225116 A1 | 9/2008 | Kang et al. | |
| 2008/0261711 A1 | 10/2008 | Tuxen | |
| 2009/0007023 A1 | 1/2009 | Sundstrom | |
| 2009/0025070 A1 | 1/2009 | Netanel et al. | |
| 2009/0046152 A1 | 2/2009 | Aman | |
| 2009/0047902 A1 | 2/2009 | Nory et al. | |
| 2009/0197630 A1 | 8/2009 | Ahn et al. | |
| 2009/0201917 A1 | 8/2009 | Maes et al. | |
| 2009/0217339 A1 | 8/2009 | Kim et al. | |
| 2009/0220080 A1 | 9/2009 | Herne et al. | |
| 2009/0225164 A1 | 9/2009 | Renkis | |
| 2009/0276805 A1 | 11/2009 | Andrews et al. | |
| 2009/0300692 A1 | 12/2009 | Mavlankar et al. | |
| 2009/0305708 A1 | 12/2009 | Matsui et al. | |
| 2009/0316795 A1 | 12/2009 | Chui et al. | |
| 2010/0070448 A1 | 3/2010 | Omoigui | |
| 2010/0097221 A1 | 4/2010 | Kreiner et al. | |
| 2010/0188531 A1 | 7/2010 | Cordes et al. | |
| 2010/0232504 A1 | 9/2010 | Feng | |
| 2011/0013836 A1 | 1/2011 | Gefen et al. | |
| 2011/0016321 A1 | 1/2011 | Sundaram et al. | |
| 2011/0113480 A1 | 5/2011 | Ma et al. | |
| 2011/0231653 A1 | 9/2011 | Bollay et al. | |
| 2011/0252235 A1 | 10/2011 | Dolan et al. | |
| 2011/0299832 A1 | 12/2011 | Butcher | |
| 2011/0304772 A1 | 12/2011 | Dasher et al. | |
| 2011/0307694 A1 | 12/2011 | Broustis et al. | |
| 2012/0033647 A1 | 2/2012 | Moon et al. | |
| 2012/0047551 A1 | 2/2012 | Pattar et al. | |

(56) References Cited

U.S. PATENT DOCUMENTS

| | | |
|---|---|---|
| 2012/0056898 A1 | 3/2012 | Tsurumi et al. |
| 2012/0062732 A1 | 3/2012 | Marman et al. |
| 2012/0072952 A1 | 3/2012 | Vaysman et al. |
| 2012/0078712 A1 | 3/2012 | Fontana et al. |
| 2012/0079031 A1 | 3/2012 | Matthews et al. |
| 2012/0117140 A1 | 5/2012 | Wang et al. |
| 2012/0221955 A1 | 8/2012 | Raleigh et al. |
| 2012/0258674 A1 | 10/2012 | Livet et al. |
| 2012/0266223 A1 | 10/2012 | Yegin et al. |
| 2012/0308202 A1 | 12/2012 | Murata et al. |
| 2012/0324069 A1 | 12/2012 | Nori et al. |
| 2013/0003576 A1 | 1/2013 | Segura et al. |
| 2013/0016910 A1 | 1/2013 | Murata et al. |
| 2013/0017836 A1 | 1/2013 | Chang et al. |
| 2013/0031582 A1 | 1/2013 | Tinsman et al. |
| 2013/0036442 A1 | 2/2013 | Wingert |
| 2013/0061035 A1 | 3/2013 | Hook et al. |
| 2013/0091430 A1 | 4/2013 | Zhai et al. |
| 2013/0091515 A1 | 4/2013 | Sakata et al. |
| 2013/0114402 A1 | 5/2013 | Ould-Brahim et al. |
| 2013/0142118 A1 | 6/2013 | Cherian et al. |
| 2013/0155106 A1 | 6/2013 | Rolleston et al. |
| 2013/0155847 A1 | 6/2013 | Li et al. |
| 2013/0163507 A1 | 6/2013 | Hoshino et al. |
| 2013/0167062 A1 | 6/2013 | Herring et al. |
| 2013/0185353 A1 | 7/2013 | Rondao et al. |
| 2013/0188503 A1 | 7/2013 | Anepu et al. |
| 2013/0188515 A1 | 7/2013 | Pinheiro et al. |
| 2013/0212236 A1 | 8/2013 | Foti et al. |
| 2013/0223339 A1 | 8/2013 | Nakahara |
| 2013/0230036 A1 | 9/2013 | Reznik et al. |
| 2013/0246784 A1 | 9/2013 | Zhang et al. |
| 2013/0266286 A1 | 10/2013 | Yu et al. |
| 2013/0294506 A1 | 11/2013 | Kang et al. |
| 2013/0312042 A1 | 11/2013 | Shaw et al. |
| 2013/0336222 A1 | 12/2013 | Lu et al. |
| 2013/0336305 A1 | 12/2013 | Yan et al. |
| 2013/0342539 A1 | 12/2013 | Khan et al. |
| 2014/0022074 A1 | 1/2014 | Balinski et al. |
| 2014/0026052 A1 | 1/2014 | Thorwirth et al. |
| 2014/0029462 A1 | 1/2014 | Stewart |
| 2014/0033074 A1 | 1/2014 | Thibaux et al. |
| 2014/0045452 A1 | 2/2014 | Ma et al. |
| 2014/0059457 A1 | 2/2014 | Min |
| 2014/0082054 A1 | 3/2014 | Denoual et al. |
| 2014/0086217 A1 | 3/2014 | Park et al. |
| 2014/0089990 A1 | 3/2014 | Van et al. |
| 2014/0149512 A1* | 5/2014 | Leitch .................. H04L 67/1061 709/204 |
| 2014/0164776 A1 | 6/2014 | Hook et al. |
| 2014/0168056 A1 | 6/2014 | Swaminathan et al. |
| 2014/0195918 A1 | 7/2014 | Friedlander |
| 2014/0204247 A1 | 7/2014 | Bilgen et al. |
| 2014/0215043 A1 | 7/2014 | Ryu et al. |
| 2014/0245367 A1 | 8/2014 | Sasaki et al. |
| 2014/0269581 A1 | 9/2014 | Song et al. |
| 2014/0269932 A1 | 9/2014 | Su et al. |
| 2014/0279068 A1 | 9/2014 | Systrom et al. |
| 2014/0280781 A1 | 9/2014 | Gregotski |
| 2014/0282751 A1 | 9/2014 | Lee et al. |
| 2014/0282909 A1 | 9/2014 | Cherian et al. |
| 2014/0351592 A1 | 11/2014 | Starsinic et al. |
| 2014/0351891 A1 | 11/2014 | Grube et al. |
| 2014/0359129 A1* | 12/2014 | Sharma .................. H04L 67/148 709/226 |
| 2015/0014773 A1 | 1/2015 | Cheng et al. |
| 2015/0029854 A1 | 1/2015 | Starsinic et al. |
| 2015/0032901 A1 | 1/2015 | Wang et al. |
| 2015/0033311 A1 | 1/2015 | Seed et al. |
| 2015/0033312 A1 | 1/2015 | Seed et al. |
| 2015/0070587 A1 | 3/2015 | Emeott et al. |
| 2015/0082029 A1* | 3/2015 | Volchok .................. H04L 63/00 713/164 |
| 2015/0089023 A1 | 3/2015 | Phillips et al. |
| 2015/0089072 A1 | 3/2015 | Phillips et al. |
| 2015/0104155 A1 | 4/2015 | Bloch et al. |
| 2015/0145782 A1 | 5/2015 | Brown et al. |
| 2015/0179219 A1 | 6/2015 | Gao et al. |
| 2015/0208103 A1 | 7/2015 | Guntur et al. |
| 2015/0222815 A1 | 8/2015 | Wang et al. |
| 2015/0264096 A1 | 9/2015 | Swaminathan et al. |
| 2015/0268822 A1 | 9/2015 | Waggoner et al. |
| 2015/0296250 A1 | 10/2015 | Casper |
| 2015/0304693 A1 | 10/2015 | Hwang et al. |
| 2015/0341091 A1 | 11/2015 | Park et al. |
| 2015/0348247 A1 | 12/2015 | McLaughlin et al. |
| 2015/0351084 A1 | 12/2015 | Werb |
| 2015/0382268 A1 | 12/2015 | Hampel et al. |
| 2016/0042496 A1 | 2/2016 | Ichimi et al. |
| 2016/0057494 A1 | 2/2016 | Hwang et al. |
| 2016/0073106 A1 | 3/2016 | Su et al. |
| 2016/0156949 A1 | 6/2016 | Hattori et al. |
| 2016/0165309 A1 | 6/2016 | Van Brandenburg et al. |
| 2016/0182593 A1 | 6/2016 | Denoual et al. |
| 2016/0183234 A1 | 6/2016 | Sung et al. |
| 2016/0192433 A1 | 6/2016 | Deenoo et al. |
| 2016/0212631 A1 | 7/2016 | Shen et al. |
| 2016/0217623 A1 | 7/2016 | Singh |
| 2016/0249269 A1 | 8/2016 | Niu et al. |
| 2016/0249353 A1 | 8/2016 | Nakata et al. |
| 2016/0253240 A1 | 9/2016 | Cocagne |
| 2016/0306036 A1 | 10/2016 | Johnson |
| 2016/0308637 A1 | 10/2016 | Frenne et al. |
| 2016/0337706 A1 | 11/2016 | Hwang et al. |
| 2016/0344464 A1 | 11/2016 | Kim |
| 2016/0360235 A1 | 12/2016 | Ramasubramonian et al. |
| 2016/0366454 A1 | 12/2016 | Tatourian et al. |
| 2017/0048826 A1 | 2/2017 | Kishiyama |
| 2017/0070735 A1 | 3/2017 | Ramasubramonian et al. |
| 2017/0118540 A1 | 4/2017 | Thomas et al. |
| 2017/0136948 A1 | 5/2017 | Sypitkowski et al. |
| 2017/0163645 A1 | 6/2017 | Bradley et al. |
| 2017/0201686 A1 | 7/2017 | Choi et al. |
| 2017/0201980 A1 | 7/2017 | Hakola et al. |
| 2017/0212583 A1 | 7/2017 | Krasadakis |
| 2017/0236288 A1 | 8/2017 | Sundaresan et al. |
| 2017/0244529 A1 | 8/2017 | Yu et al. |
| 2017/0273063 A1 | 9/2017 | Kim et al. |
| 2017/0302719 A1 | 10/2017 | Chen et al. |
| 2018/0012376 A1 | 1/2018 | Dayal et al. |
| 2018/0270698 A1 | 9/2018 | Babaei et al. |
| 2018/0317213 A1 | 11/2018 | Islam et al. |
| 2018/0332632 A1 | 11/2018 | Vikberg et al. |
| 2018/0343043 A1 | 11/2018 | Hakola et al. |
| 2019/0036910 A1 | 1/2019 | Choyi et al. |
| 2019/0224474 A1 | 7/2019 | Yang et al. |
| 2020/0021999 A1 | 1/2020 | Park et al. |
| 2020/0059969 A1 | 2/2020 | Agiwal |
| 2021/0004696 A1* | 1/2021 | Lin .................. G06F 21/602 |
| 2021/0013984 A1 | 1/2021 | Frenne et al. |
| 2021/0021314 A1 | 1/2021 | Sun et al. |
| 2021/0130629 A1 | 5/2021 | Suzuki et al. |

FOREIGN PATENT DOCUMENTS

| | | |
|---|---|---|
| CN | 101350923 A | 1/2009 |
| CN | 102238547 A | 11/2011 |
| CN | 102752877 A | 10/2012 |
| CN | 102907068 A | 1/2013 |
| CN | 102939573 A | 2/2013 |
| CN | 103190089 A | 7/2013 |
| CN | 104012106 A | 8/2014 |
| CN | 104052788 A | 9/2014 |
| CN | 104092488 A | 10/2014 |
| CN | 104220975 A | 12/2014 |
| CN | 105103566 A | 11/2015 |
| CN | 105144727 A | 12/2015 |
| CN | 105264904 A | 1/2016 |
| CN | 105373331 A | 3/2016 |
| CN | 106023261 A | 10/2016 |
| CN | 106233745 A | 12/2016 |
| CN | 106416223 A | 2/2017 |
| EP | 1175785 A1 | 1/2002 |
| EP | 2086266 A2 | 8/2009 |

(56) References Cited

FOREIGN PATENT DOCUMENTS

| | | |
|---|---|---|
| EP | 2408196 A1 | 1/2012 |
| EP | 2426645 A1 | 3/2012 |
| EP | 2530675 A2 | 12/2012 |
| EP | 2824883 A1 | 1/2015 |
| EP | 2824885 A1 | 1/2015 |
| EP | 2882110 A1 | 6/2015 |
| EP | 2919471 A1 | 9/2015 |
| EP | 3076672 A1 | 10/2016 |
| EP | 3110160 A1 | 12/2016 |
| EP | 3089408 B1 | 4/2019 |
| JP | 63-013503 A | 1/1988 |
| JP | 2004-104351 A | 4/2004 |
| JP | 2007-192988 A | 8/2007 |
| JP | 2010050269 A | 3/2010 |
| JP | 2012507961 A | 3/2012 |
| JP | 2013-522965 A | 6/2013 |
| JP | 2014502128 A | 1/2014 |
| JP | 2014-525191 A | 9/2014 |
| JP | 2014-530534 A | 11/2014 |
| JP | 2016013351 A | 1/2016 |
| JP | 6313503 B1 | 4/2018 |
| KR | 10-2003-0089363 A | 11/2003 |
| KR | 10-2008-0041237 A | 5/2008 |
| KR | 10-2010-0065327 A | 6/2010 |
| KR | 10-2014-0043532 A | 4/2014 |
| KR | 10-2014-0098156 A | 8/2014 |
| KR | 10-2014-0123870 A | 10/2014 |
| KR | 101563469 B1 | 10/2015 |
| KR | 10-2016-0021141 A | 2/2016 |
| KR | 10-2016-0055086 A | 5/2016 |
| KR | 10-2016-0086904 A | 7/2016 |
| KR | 10-2017-0128515 A | 11/2017 |
| KR | 10-2019-0089423 A | 7/2019 |
| WO | 00/65837 A1 | 11/2000 |
| WO | 01/18658 A1 | 3/2001 |
| WO | 2010/021705 A1 | 2/2010 |
| WO | WO 2010082805 A2 | 7/2010 |
| WO | 2011/082150 A1 | 7/2011 |
| WO | 2011/112683 A1 | 9/2011 |
| WO | 2012/021246 A2 | 2/2012 |
| WO | 2012/114666 A1 | 8/2012 |
| WO | 2012/141557 A2 | 10/2012 |
| WO | 2014/057131 A1 | 4/2014 |
| WO | WO 2014059591 A1 | 4/2014 |
| WO | 2014/067566 A1 | 5/2014 |
| WO | WO 2014090200 A1 | 6/2014 |
| WO | 2014/111423 A1 | 7/2014 |
| WO | WO 2014135126 A1 | 9/2014 |
| WO | WO 2014145947 A1 | 9/2014 |
| WO | 2014/183803 A1 | 11/2014 |
| WO | 2014/190308 A1 | 11/2014 |
| WO | 2015/013645 A1 | 1/2015 |
| WO | 2015/013685 A1 | 1/2015 |
| WO | 2015/059194 A1 | 4/2015 |
| WO | 2015/080646 A1 | 6/2015 |
| WO | 2015/122737 A1 | 8/2015 |
| WO | 2015/166840 A1 | 11/2015 |
| WO | 2016/028111 A1 | 2/2016 |
| WO | 2016/040290 A1 | 3/2016 |
| WO | 2016/040833 A1 | 3/2016 |
| WO | WO 2016033731 A1 | 10/2016 |
| WO | 2017/061297 A1 | 4/2017 |

OTHER PUBLICATIONS

3GPP TR 22.863 V0.3.1, "Feasibility Study on New Services and Markets Technology Enablers—Enhanced Mobile Broadband", Release 14, Jun. 2012, 13 pages.
3GPP TSG-RAN WG1 #85 R1-164694, Qualcomm Incorporated, Frame Structure Requirements, May 2016, 5 pages.
Catt, "Discussion on beam-based operation", 3GPP TSG RAN WG1 Meeting #85, R1-164255, May 2016, pp. 3.
Dahlman, Erik, et al., "4G: LTE/LTE-Advanced for Mobile Broadband, Second Edition", Academic Press, Apr. 2011, 509 pages.
LG Electronics, "Transmission modes for Un PDSCH", 3GPP TSG RAN WG1 Meeting #63, R1-106138, 2010, pp. 3.
"Machine-to-Machine communications (M2M); Functional architecture; European Telecommunications Standards Institute (ETSI) TS 102 690 V2-0-14 rev marks", 650 Route Des Lucioles ; F-06921 Sophia-Antipolis; France, vol. SmartM2M, No. V2.0.14, Jul. 5, 2013 (Jul. 5, 2013), pp. 1-332, XP014184339.
3GPP TR 23.720 V13.0.0, "3rd Generation Partnership Project; Technical Specification Group Services and System Aspects; Study on Architecture Enhancements for Cellular Internet of Things (Release 13)", Mar. 2016, 94 pages.
3GPP TR 38.913 V0.2.0, "3rd Generation Partnership Project; Technical Specification Group Radio Access Network; Study on Scenarios and Requirements for Next Generation Access Technologies; (Release 14)", Feb. 2016, 19 pages.
3GPP TR 38.913 V14.3.0, 3rd Generation Partnership Project; Technical Specification Group Radio Access Network; Study on Scenarios and Requirements for Next Generation Access Technologies; (Release14), Jun. 2017, 39 pages.
3GPP TS 36.213 V13.0.0, "3rd Generation Partnership Project; Technical Specification Group Radio Access Network; Evolved Universal Terrestrial Radio Access (E-UTRA); Physical layer procedures (Release 13)", Dec. 2015, 326 pages.
3GPP TSG RAN WG1 *85, R1-164013, Samsung, "Framework for Beamformed Access", May 2016, 4 pages.
3GPP, 3GPP TR 33.812 Feasibility Study on the Security Aspects of Remote Provisioning and Charge of Subscription for Machine to Machine (M2M) Equipment (Release 9), Jun. 2010.
3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, no. Belgrade Serbia, Aug. 24, 2015, 3 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.863 V14.1.0, Technical Specification Group Services and System Aspects, Feasibility Study on New Services and Markets Technology Enablers— Enhanced Mobile Broadband, Stage 1 (Release 14), Sep. 2016, 21 pages.
3rd Generation Partnership Project (3GPP) TR 22.864 V14.1.0, Technical Specification Group Services and System Aspects, Feasibility Study on New Services and Markets Technology Enablers— Network Operation, Stage 1 (Release 14), Sep. 2016, 35 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TS 36.133 V14.7.0, Technical Specification Group Radio Access Network, Evolved

(56) References Cited

OTHER PUBLICATIONS

Universal Terrestrial Radio Access (E-UTRA), Requirements for support of radio resource management (Release 14), Mar. 2018, 2997 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project, "Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, 82 pages.
3rd Generation Partnership Project, "Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, 507 pages.
3rd Generation Partnership Project; (3GPP) TR 22.891 V1.1.0, Technical Specification Group Services and System Aspects; Feasibility Study on New Services and Markets Technology Enablers; Stage 1 (Release 14), Nov. 2015, 95 pages.
3rd Generation Partnership Project; (3GPP) TR 36.912 V13.0.0, Technical Specification Group Radio Access Network; Feasibility Study for Further Advancements for E-UTRA (LTE-Advanced) (Release 13), Dec. 2015, 62 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TSG RAN WG2 Meeting #93bis, R2-162571, Apr. 2016, 3 pages.
3rd Generation Partnership Project; 3GPP TS 23.228 V12.1.0; Technical Specification Group Services and System Aspects; IP Multimedia Substystem (IMS); Stage 2 (Release 12), Jun. 2013, 296 pages.
Chu, David, "Polyphase Codes With Good Periodic Correlation Properties", IEEE Transactions On Information Theory, Jul. 1972, 531-532.
Damour, N., "List of Common Services Functions—Call for Contributions", M2M Functional Architecture Technical Specification, Doc# oneM2M-ARC-2013-0304R04-List of oneM2M CSFs-Call for contributions-2.DOC Input Contribution, Jul. 11, 2013, 1-5 pages.
Darmour Nicolas: "Doc# oneM2M-ARC-2013-0304R04-List_of_ oneM2M_CSFs_-_call_for_contributions-2.DOC Input Contribution", , Jul. 11, 2013 (Jul. 13, 2013), pp. 1-5, XP55141557, Online. Doc# oneM2M-ARC-2013-0312-Missing_definitions_for_WG1_ work_progress.doc Input Contribution.
European Telecommunications Standards Institute (ETSI TS) LTE; General Packet Radio Service (GPRS) enhancements for Evolved Universal Terrestrial Radio Access Network (E-UTRAN) access (Release 13), 3GPP TS 23.401 V13.6.1, May 2016 (367 pages).
European Telecommunications Standards Institute (ETSI TS) Digital cellular telecommunications system (Phase 2+) (GSM); Universal Mobile Telecommunications System (UMTS); General Packet Radio Service (GPRS); Service Description; Stage 2 (3GPP TS 23.060 version 13.6.0 (Release 13) Apr. 2016 (364 pages).
European Telecommunications Standards Institute (ETSI TS) 124 302 V13.5.0, Universal Mobile Telecommunications System (UMTS); LTE; Access to the 3GPP Evolved Packet Core (EPC) via non-3GPP access networks; Stage 3 (Release 13), 3GPP TS 24.302 V13.5.0, Apr. 2016 (128 pages).
European Telecommunications Standards Institute (ETSI TS) 136 304 V13.0.0, "LTE; Evolved Universal Terrestrial Radio Access (E-UTRA); User Equipment (UE) procedures in idle mode" (Release 13), 3GPP TS 36.304 V13.0.0, Feb. 2016 (44 pages).
European Telecommunications Standards Institute (ETSI), TS 102 690 V1.1.1, Technical Specification, Machine-to-Machine Communications (M2M); Functional Architecture, Oct. 2011, 280 pages.
European Telecommunications Standards Institute (ETSI), TS 102 690 V1.2.1, Technical Specification, Machine-to-Machine Communications (M2M); Functional Architecture, Jun. 2013.
European Telecommunications Standards Institute (ETSI), TS 102 690 V2.0.14, Technical Specification, Machine-to-Machine Communications (M2M); Functional Architecture, Jul. 2013, 332 pages.
Huawei et al., "Initial access in NR unlicensed", 3GPP Draft; R1-1808062, 3rd Generation Partnership Project (3GPP), Mobile Competence Centre ; 650, Route Des Lucioles F-06921 Sophia-Antipolis Cedex ; France, vol. RAN W11, no. Gothenburg, Sweden; Aug. 20, 2018-Aug. 24, 2018 Aug. 10, 2018 (Aug. 10, 2018), XP051515466.
Huawei et al: "Numerology and wideband operation in NR unlicensed", 3GPP Draft; R1-1803677, 3rd Generation Partnership Project (3GPP), Mobile Competence Centre ; 650, Route Des Lucioles ; F-06921 Sophia-Antipolis Cedex ; France, vol. RAN WG1, no. Sanya, China; Apr. 16, 2018-Apr. 20, 2018 Apr. 15, 2018 (Apr. 15, 2018), XP051425974.
Huawei, "Network slice selection", RAN WG3 Meeting #92, R3-161134, May 23-27, 2016, 4 pages.
IEEE P802.11, Wireless LANs, Proposed TGax draft specification, Comment Resolutions on UL MU Operation, Sep. 13, 2016, (30 pages).
IN Office Action Mailed on Oct. 9, 2019 for IN Application No. 201617003324.
Intel Corporation, "Overview of new radio access technology requirements and designs", 3GPP Tdoc R1-162379, 3GPP TSG RAN WG1 Meeting #84bis, Busan, Korea, Apr. 11-15, 2016, 4 pages.
International Application No. PCT/US2014/048245: International Search Report and Written Opinion dated Oct. 31, 2014, 14 pages.
International Application No. PCT/US2014/048309: International Search Report and Written Opinion dated Jul. 10, 2014, 15 pages.
International Telecommunication Union, ITU-R Radiocommunication Sector of ITU, Recommendation ITU-R M.2083-0, "IMT Vision—Framework and Overall Objectives of the Future Development of IMT for 2020 and Beyond" M Series Mobile, radiodetermination, amateur and related satellite services, Sep. 2015, 21 pages.
ITRI, "Discussion on resource utilization for UE-specific BF CSI-RS", R1-162987, 7.3.3.1.2, 3GPP TSG RAN WG1 Meeting #84b, 2016, 2 Pages.
Japanese Patent Application No. 2016-530089: Notice of Reasons for Rejection dated Mar. 14, 2017, 8 pages.
U.S. Appl. No. 17/400,561, filed Aug. 11, 2021.
U.S. Appl. No. 16/691,765, filed Nov. 21, 2019.
U.S. Appl. No. 14/341,479, filed Jul. 24, 2014.
Korean Patent Application No. 10-2016-7004593: Office Action dated Feb. 16, 2017, five pages (No Translation).
Korean Patent Application No. 10-2016-7004593: Preliminary Rejection dated Sep. 14, 2017, 4 pages.
Mavlankar. et. al., "Video Streaming with Interactive Pan/Tilt/Zoom", Stanford University, 26 pages. Available at: http://web.stanford.edu/~bgirod/pdfs/Mavlankar_Girod_Chapter_Oct09.pdf.
Motorola Mobility, "Synchronization signal in NR", 3GPP TSG-RAN WG1#86b R1-1609917, Oct. 2016, 5 Pages.
NGMN 5G Initiative White Paper v1.0, Feb. 17, 2015, 125 pages.
Nokia et al: "Feature Lead's Summary on Channel Access Procedures", 3GPP Draft; R1-1809801 NRCJ Channel Access Summary, 3rd Generation Partnership Project (3GPP), Mobile Competence Centre ; 650, Route Des Lucioles ; F-06921 Sophia-Antipolis Cedex ; France, vol. RAN WG1, no. Gothenburg, Sweden; Aug. 20, 2018-Aug. 20, 2018 Aug. 23, 2018 (Aug. 23, 2018), XP051517160.
OMA Open Mobile Alliance, OMA-TS-LightweightM2M-V1_0-20130206-D, "Lightwieght Machine to Machine Technical Specification, Draft Version 1.0", Feb. 6, 2013, 53 pages.
OneM2M Technical Specification, oneM2M-TS-0001 oneM2M Functional Architecture-V-0.0.3, oneM2M Functional Architecture, Jun. 8, 2013, 11 pages.

(56) References Cited

OTHER PUBLICATIONS

Qualcomm incorporated S2-162339 "Solution for key issue 1 on network slicing : network slice and network functions selection based on evolved eDeCOR model", May 2016, pp. 1-7.
Rosenberg et al., "SIP: Session Initiation Protocol" Network Working Group, RFC: 3261, Jun. 2002, 270 pages.
Sun, et. al., The Dynamic Videobook: A Hierarchical Summarization for Surveillance Video, Published in IEEE Sep. 2013, pp. 3963-3966.
The Exalted Consortium, WP5—Security, Authentication & Provisioning., Deliverable 5.1 Security and Provisioning Solutions, Feb. 29, 2012.
Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).
Wang. A. et al., "Research on tower crane automatic tracking and zooming video monitoring system based on Improved Camshift algorithm," 2011 International Conference on Electric Information and Control Engineering, Wuhan, 2011, pp. 4434-4437.
ZTE: "Considerations on channel access procedure for NR-U", 3GPP Draft; R2-1811281 Considerations On Random Access Procedure for NR-U, 3rd Generation Partnership Project (3GPP), Mobile Competence Centre ; 650, Route Des Lucioles ; F-06921 Sophia-Antipolis Cedex ; France, vol. RAN WG2, no. Gothenburg, Sweden; Aug. 20, 2018-Aug. 24, 2018 Aug. 9, 2018, (Aug. 9, 2018), XP05152094.

3rd Generation Partnership Project; "Slice Selection solution update", S2-162717, (revision of S2-16), Nokia, Alcatel-Lucent Shanghai Bell, SA WG2 Meeting #115, May 23-27, 2016, Nanjing, P.R. China, 10 pages.
Third Generation Partnership Project, "Technical Specification Group Radio Access Network: Evolved Universal Terrestrial Radio Access (E-UTRA) and Evolved Universal Terrestrial Radio Access Network (E-UTRAN); Overall description; stage 2 (Release 13)," 3GPP TS 36.300 V13.2.0 (Dec. 2013).
Huawei, et al., R1-150980 "Design of initial downlink transmission for LBE-based LAA", 3GPP TSG RAN WG1 Ad-hoc Meeting, Paris, France, Mar. 24-26, 2015, 6 pages.
NTT Docomo, R1-157351: "Initial Views on Technical Design for NB-IoT", 3GPP TSG RAN WG1 Meeting #83, Anaheim, USA, Nov. 15-22, 2015, 3 pages.
3rd Generation Partnership Project (3GPP) TR 22.861 V14.0.0, "Technical Specification Group Services and Systems Aspects, Feasibility Study on New Services and Markets Technology Enablers for Massive Internet of Things, Stage 1 (Release 14)", Jun. 2016, 28 pages.
3GPP TS 36.133 V14.0.0, "Technical Specification Group Radio Access Network; Evolved Universal Terrestrial Radio Access (E-UTRA); Requirements for support of radio resource management (Release 14)," (Jun. 2016), 2046 pages.
3GPP specs\36_series, "Presentation of Specification/Report to TSG", RP-151814, (TR 36.878, v2.0.0), 3GPP TSG-RAN Meeting #70, Sitges, Spain, Dec. 7-10, 2015, 2 pages.

* cited by examiner

END-TO-END M2M SERVICE LAYER SESSIONS

CROSS-REFERENCE TO RELATED APPLICATIONS

This application is a continuation of U.S. patent application Ser. No. 17/400,561 filed Aug. 12, 2021 which is a continuation of U.S. patent application Ser. No. 16/691,765 filed Nov. 22, 2019 which is a continuation of U.S. patent application Ser. No. 14/341,479, filed on Jul. 25, 2014 entitled "END-TO-END M2M SERVICE LAYER SESSIONS" which claims the benefit of U.S. Provisional Patent Application No. 61/858,387, filed on Jul. 25, 2013, entitled "E2E-M2M SERVICE LAYER SESSIONS," and U.S. Provisional Patent Application No. 61/886,787, filed on Oct. 4, 2013, entitled "ENHANCED METHODS AND PROCEDURES TO SUPPORT END-TO-END M2M SERVICE LAYER SESSIONS," the contents of which are hereby incorporated by reference herein.

BACKGROUND

A communication session may involve a persistent interactive exchange of information between two or more communicating entities (e.g. devices, applications, etc.). A communication session is established at a certain point in time, and torn down at a later point in time based on various circumstances (e.g. after the session times out or when one of the entities decides to terminate the session). A communication session may involve the exchange of multiple messages between entities and may be stateful. Stateful may mean that at least one of the communicating entities saves information about the session history in order to be able to maintain the communication session (e.g., security context such as credentials, identifiers, etc.).

A conventional application session is a communication session between two or more applications that is established and managed by the applications themselves rather than by an underlying communication protocol or service layer. As a result, application sessions can add extra overhead and complexity to applications.

A machine-to-machine (M2M) service layer is an example of one type of application service layer specifically targeted towards providing value-added services for M2M type devices and applications. For example, an M2M service layer can support Application Programming Interfaces (APIs) providing applications and devices access to a collection of M2M centric capabilities supported by the service layer. A few examples include security, charging, data management, device management, discovery, provisioning, and connectivity management. These capabilities are made available to applications via APIs which make use of message formats, resource structures and resource representations defined by the M2M service layer.

A machine-to-machine (M2M) service layer session is a communication session established between an M2M service layer instance and either an M2M application or another M2M service layer instance. An M2M service layer session can consist of M2M service layer state related to connectivity, security, scheduling, data, context, etc. This state can be maintained by the M2M service layer, an M2M application, or both.

There are multiple machine-to-machine (M2M) architectures with service layers, such as European Telecommunications Standards Institute (ETSI) M2M service layer discussed in draft ETSI TS 102 690 1.1.1 (2011-10), the Open Mobile Alliance (OMA) Lightweight M2M service layer discussed in draft version 1.0-14 Mar. 2013, and the oneM2M service layer discussed in oneM2M-TS-0001 oneM2M Functional Architecture-V-0.1.2. M2M service layer architectures (e.g., ETSI M2M, OMA LWM2M, and oneM2M). Another example of an application service layer is the IP Multimedia Subsystem (IMS) service layer TS 23.228, 3rd Generation Partnership Project that is specifically targeted to providing multimedia services for mobile network devices. These architectures may lack support for end-to-end security services (e.g., end-to-end encryption and authentication), end-to-end quality of service functionality (e.g., end-to-end latency or bandwidth guarantees), and end-to-end negotiation of settings or configuration (e.g., negotiating a type of compression used), as discussed herein.

Conventional methods of supporting end-to-end (E2E) sessions rely on applications and/or end users to establish and manage E2E sessions. This is an over-the-top methodology that results in overhead and added complexity to applications and/or the need for users to take part in session management. This over-the-top method also prevents network services from providing value-added session functionality such as data aggregation and data analytics, since data is encrypted by the applications in an E2E fashion and hence is not able to be processed securely by services in the network. Many M2M use cases require E2E sessions. For example, use cases using end-to-end security and privacy such as eHealth, banking, and military, as well as use cases using end-to-end quality of service such as video surveillance, patient monitoring, and emergency services. In addition, many M2M devices are unmanned, which also presents challenges for managing end-to-end sessions. For example, unmanned devices cannot rely on a user to generate, dynamically, a secure end-to-end session each time a session needs to be established.

SUMMARY

Existing M2M service layer architectures lack support for end-to-end M2M service layer sessions. An M2M service layer session is a communication session established between an M2M service layer instance and either an M2M application or another M2M service layer instance. An M2M service layer session can consist of M2M service layer state related to connectivity, security, scheduling, data, context, etc. This state can be maintained by the M2M service layer, an M2M application, or both.

Disclosed herein are methods, devices, and systems to support E2E M2M service layer sessions. Mechanisms are disclosed that support M2M service layer sessions that may span multiple service layer hops where an M2M service layer hop is a direct M2M service layer communication session between two M2M service layer instances or between an M2M service layer instance and an M2M application. Session endpoint and session management functions support methods for E2E encryption and compression of data flowing between E2E session endpoints that allows trusted intermediate session managers with the ability to encrypt/decrypt or compress/decompress the data and provide value added data services such as data analytics, data aggregation, data mash-ups, etc.

In an example, an apparatus may include a processor and a memory coupled with the processor. The processor may effectuate operations may include receiving one or more requests from an application to create and configure a policy that the service layer apparatus uses to establish an end-to-end service layer session between two or more service layer session endpoints, wherein the service layer endpoints are configured as applications or other service layer apparatus, the one or more requests configuring a desired level of QoS that is required for the service layer session communication between the service layer session endpoints, and a set of valid service layer session endpoints and resource paths to restrict the scope of the service layer session to a defined set of endpoint resources hosted by the service layer session endpoints; receiving a first request from one of the service layer session endpoints to perform a specified operation on a targeted resource of another service layer session endpoint defined in the policy; finding an applicable session policy resource based on a match of the service layer endpoints defined in the policy against the service layer endpoint that originated the first request and a service layer endpoint targeted by the first request; verifying the targeted resource is a resource specified in the valid resource paths of the policy; forwarding the first request to the resource of the targeted service layer endpoint in a manner that is consistent with the desired level of QoS defined in the policy; receiving a response back from the targeted service layer endpoint comprising the results of the operation performed on the targeted resource; and forwarding the response to the service layer session endpoint that originated the first request in a manner that is consistent with the desired level of QoS defined in the policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Conventional methods of supporting end-to-end (E2E) sessions rely on applications and/or end users to establish and manage E2E sessions. This over-the-top method may result in overhead and added complexity to applications or the need for users to take part in session management. With regard to machine-to-machine (M2M) implementations, added overhead and complexity may be of particular concern because many end devices may be resource-constrained devices, such as a thermostat or a weighing scale. When conventional methods are used M2M application data flowing through the M2M service layer is typically encrypted or compressed using M2M application layer security credentials or algorithms that the M2M service layer is not privy to. Because, in this scenario, the M2M service layer is not a trusted entity that is able to decrypt or decompress the data, the M2M service layer cannot provide value-added session functionality, such as data aggregation and data analytics.

Conventional M2M service layers may call for the creation of an M2M session between two M2M service layer instances or between an M2M service layer instance and an M2M application within a single service layer hop of one another, where the service layer hop may be defined as a direct service layer communication link. Because of the conventional M2M setup, endpoint M2M applications may communicate over the top of the service layer to setup and manage end-to-end sessions. For example, for the ETSI M2M service layer, M2M applications establish end-to-end sessions by exchanging messages with one another through ETSI M2M container resources. These messages flow through the ETSI M2M service layer in an opaque manner and are not parseable or visible to the service layer. Hence, the service layer may be unable to provide value-added end-to-end session management services to the applications.

Disclosed herein are mechanisms to support E2E sessions with the M2M service layer that may span multiple M2M service layer hops. These E2E M2M service layer sessions (service layer sessions) are sessions that allow the M2M service layer to participate in end-to-end security services, end-to-end quality of service functionality, end-to-end negotiation of settings or configuration, among other value-added session functionality, such as data aggregation and data analytics. The methods and functional architectures as discussed throughout (e.g., FIG. 4, FIG. 5, and throughout) may be implemented by a combination of software and hardware. The functional architectures may be implemented on a single device or distributed among multiple devices. The devices maybe one or more of the devices as described below with regard to FIG. 25A through FIG. 25D.

Figure 1:
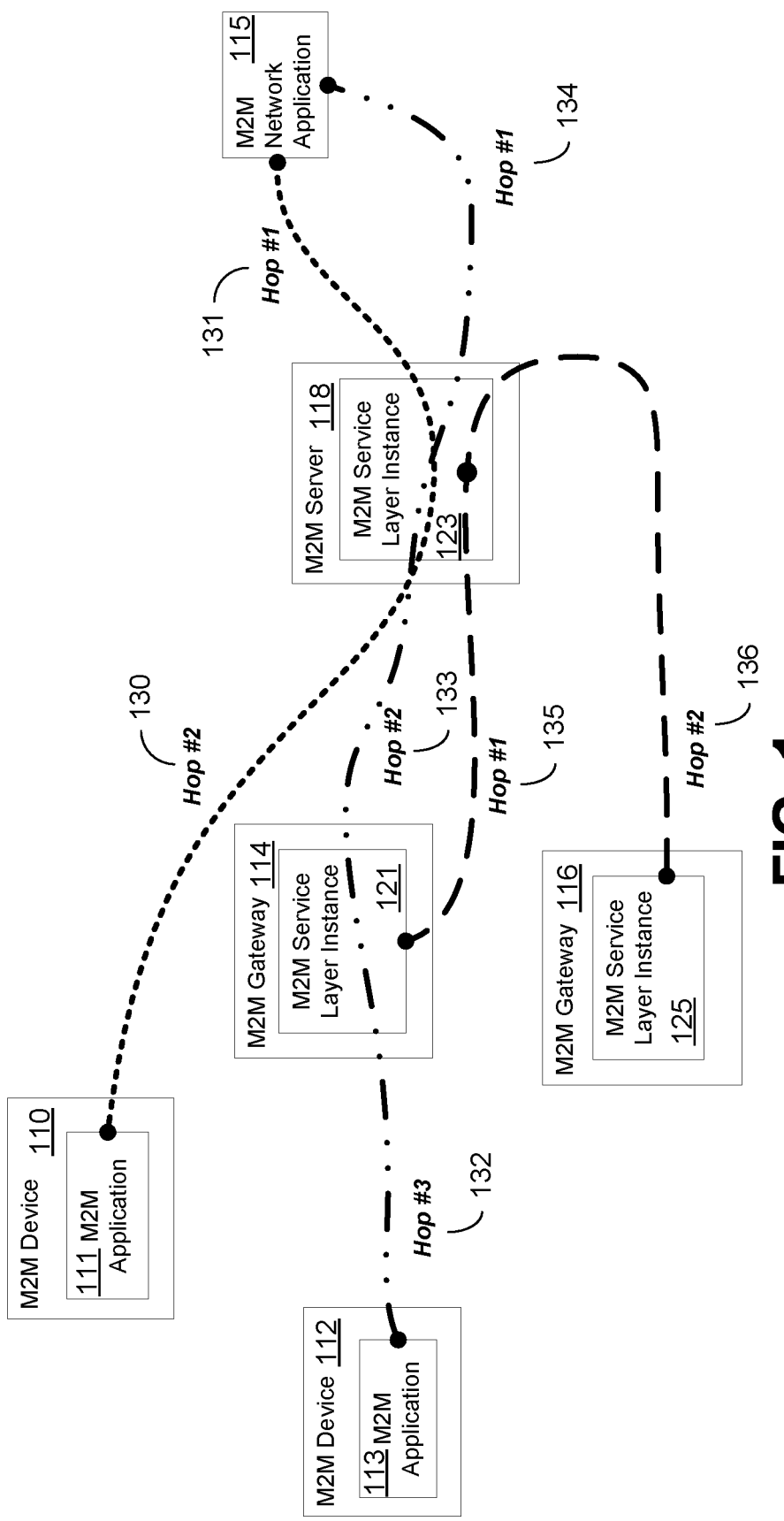
FIG. 1 illustrates E2E M2M service layer sessions embodiments.

For additional perspective, FIG. 1 illustrates exemplary E2E M2M service layer sessions that span multiple hops. As illustrated in FIG. 1, an M2M device 110 may include an M2M application 111. M2M application 111 may be involved in an E2E M2M service layer session with M2M network application 115 (an endpoint M2M application that may be on a device such as a tablet, server, personal computer, or smartphone). The M2M service layer session of M2M application 111 includes multiple hops (hop 130 and hop 131) and is facilitated by M2M service layer instance 123 located on M2M server 118.

FIG. 1 also shows an example of a service layer session facilitated by two M2M service layer instances; one hosted on an M2M server and another on an M2M gateway. As shown in FIG. 1, M2M application 113 of M2M device 112 may be involved in an E2E M2M service layer session with M2M network application 115. The M2M service layer session of M2M application 113 includes multiple hops (hop 132, 133, and hop 134) and is facilitated by multiple M2M service layer instances (M2M service layer instance 121 of M2M gateway 114 and M2M service layer instance 123 of M2M server 118). M2M service layer instance 121 and M2M service layer instance 123 may communicate with one another to manage the E2E M2M service layer session (e.g., establish the session or tear-down the session).

FIG. 1 also shows a service layer session that is involved in a session between two M2M gateways. As shown in FIG. 1, M2M service layer instance 125 of M2M gateway 116 is in an M2M service layer session with M2M service layer instance 121 of M2M gateway 114. The M2M service layer session of M2M service layer instance 125 includes multiple hops (hop 136 and hop 135) and is facilitated by M2M service layer instance 123 of M2M server 118. Additional examples (not shown) are possible for E2E M2M service layer sessions. For example, an E2E M2M service layer session may be between two M2M servers that are multiple service layer hops away from one another. Another example may involve a direct E2E session between two endpoint applications, which does not flow through the M2M service layer but is facilitated by the M2M service layer. In other words, the service layer may provide application discovery and E2E session credential establishment services that applications may use to discover each other and dynamically provision credentials.

Figure 2:
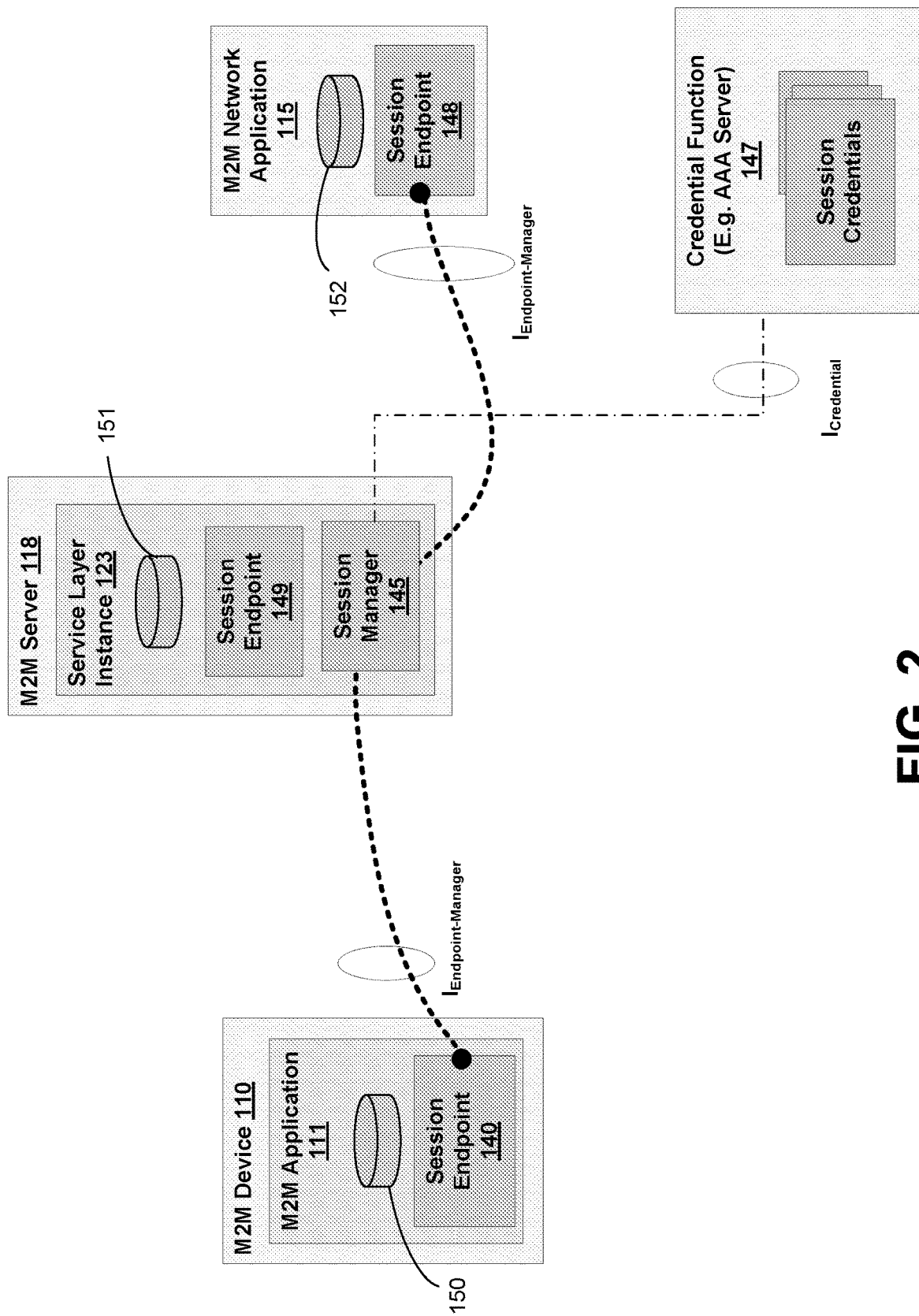
FIG. 2 illustrates an E2E M2M service layer session of FIG. 1 with additional details.

As described in more detail below, to support service layer sessions, one or more of the following M2M service layer architectural elements may exist: an E2E M2M service layer session manager function (session manager function), E2E M2M service layer session endpoint function (session endpoint function), E2E M2M service layer session credential bootstrapping function (session credential function), M2M Service layer session state (session state), and E2E M2M service layer session interfaces (session interface). FIG. 2 is an illustration of an M2M session in FIG. 1, which includes the aforementioned M2M service layer architectural elements. M2M session endpoint functions, such as session endpoint function 140, session endpoint function 149, and session endpoint function 148, may respectively reside with M2M device 110, M2M server 118, and M2M network application 140. As discussed in more detail herein, a session endpoint function enables an M2M application or M2M service layer instance to participate in a service layer session. The session endpoint function interacts with a session manager.

With continued reference to FIG. 2, an E2E M2M service layer session manager (e.g., session manager 145) may reside with an M2M server (e.g., M2M server 118) or an M2M gateway. As discussed in more detail below, a session manager supports establishment, tear-down, and management of service layer sessions. The session manager may perform translations of session addresses or identifier address (e.g., translating between a public session identifier and private session identifier). In addition, the session manager supports the capability to route service layer messages to other session managers such that these messages may be delivered to session endpoints not directly connected to it.

With further reference to FIG. 2, M2M service layer sessions may involve a session credential function, such as session credential function 147. Session credential function 147 may support provisioning or bootstrapping of service layer session related credentials and configuration information. Session managers or session endpoints may use these session credentials. The session credential function may reside on an AAA server and have a $I_{credential}$ interface (e.g., $I_{credential}$ 157) that uses the Diameter protocol. In addition, service layer sessions may include a session state, which any of the M2M devices may have, such as M2M device 110, M2M server 118, and M2M network 115. Session state is information that may be maintained by session managers or session endpoints and may be used for session management purposes.

Figure 3:
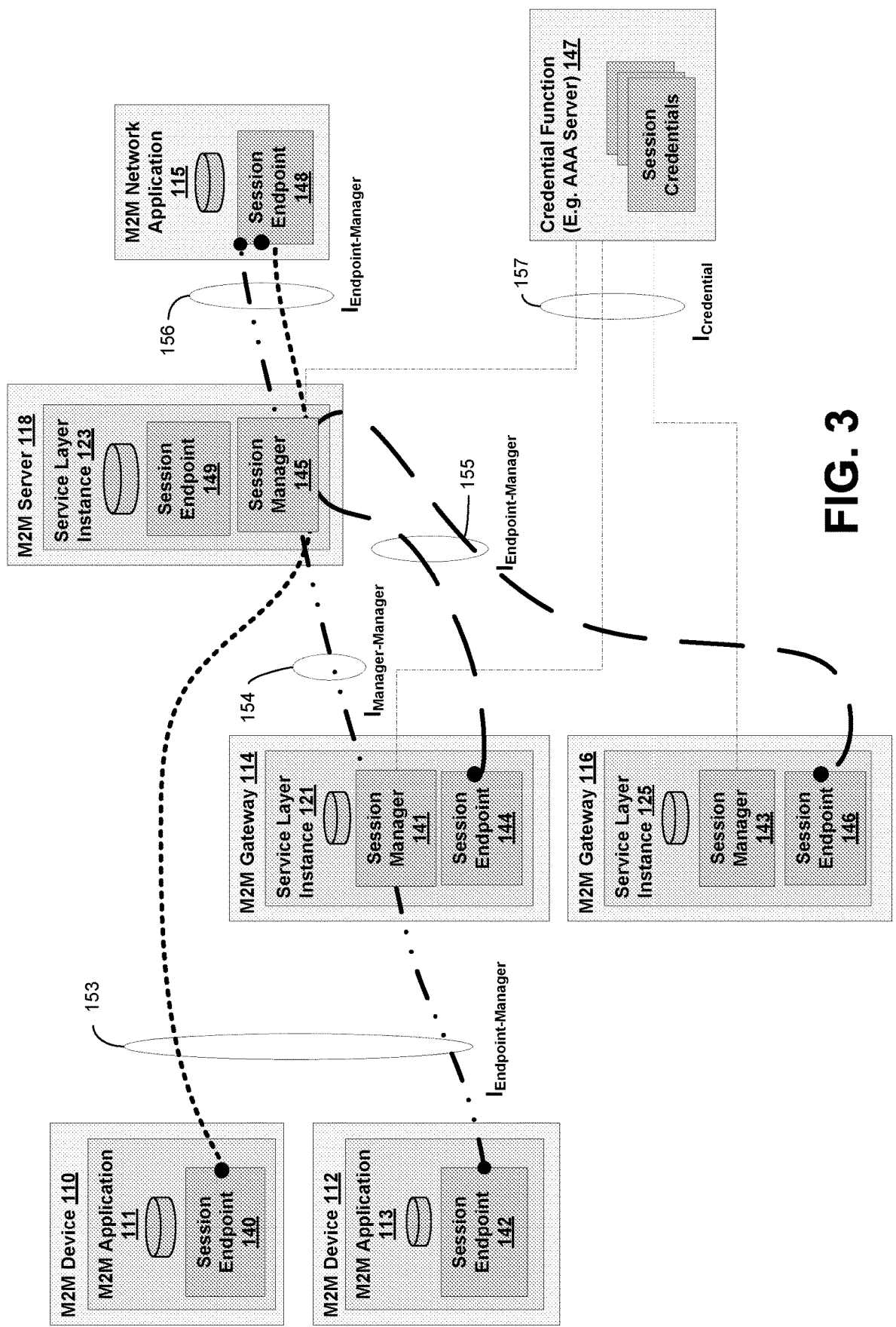
FIG. 3 illustrates E2E M2M service layer sessions of FIG. 1 with additional details.

FIG. 3 illustrates multiple examples of service layer sessions of FIG. 1 that include the aforementioned M2M service layer architectural elements. As shown in FIG. 3, there may be an $I_{Manager-Manager}$ interface between session managers (e.g., $I_{Manager-Manager}$ 154) and an $I_{Endpoint-Manager}$ interface between a session endpoint and session manager (e.g., $I_{Endpoint-Manager}$ 153, $I_{Endpoint-Manager}$ 155, $I_{Endpoint-Manager}$ 156). As shown in FIG. 3, session manager 145 manages multiple M2M service layer sessions between multiple nodes.

Below are more detail methods and system descriptions with regard to some of the functions of FIG. 3, such as a session credential function, a session manager, and session state information, among other things.

A session credential function supports bootstrapping of session security credentials ("security credentials" or "session credentials") to the individual session endpoints, as well as the session managers making up the service layer session that spans multiple service layer hops, where the service layer hop may be defined as a direct service layer communication link between two or more of the following: a service layer instance or application. As discussed herein, session credentials and security credentials for securing the session are used synonymously. A method (not shown) of provisioning the session credentials may be a pre-provisioning step that is performed by the manager or owner of the session credential function. For example, per each service layer instance, a pool of session credentials may be pre-provisioned into the session credential function. Thereafter the session manager may make requests to the session credential function to allocate session credentials when required.

Figure 4:
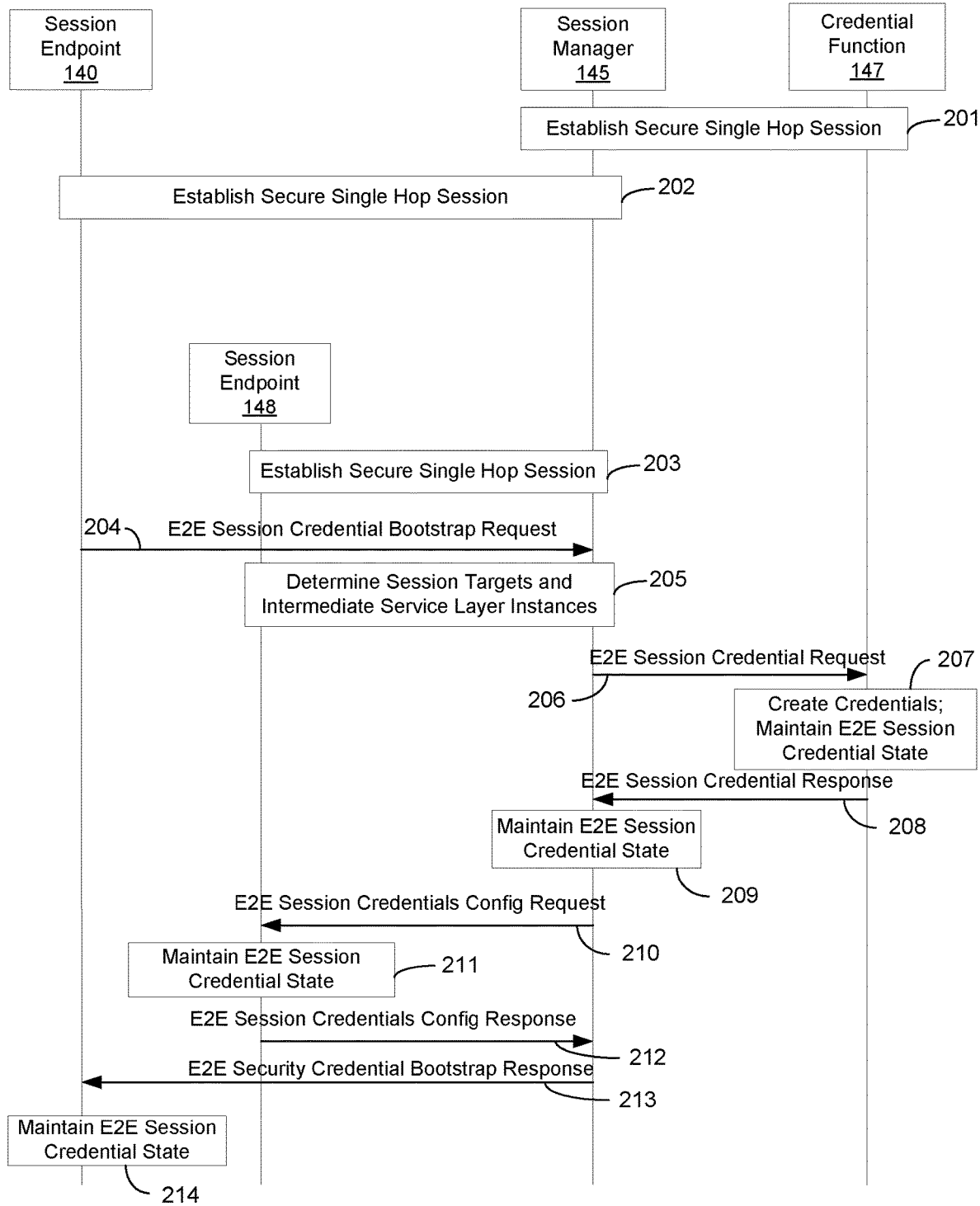
FIG. 4 illustrates an exemplary method of session credential function bootstrapping.

FIG. 4 illustrates an exemplary method of session credential function bootstrapping, which configures the session credentials between different session participants, which may reside on an M2M device, M2M server, M2M gateway, or the like. It may be assumed for FIG. 4 that session endpoint 140 is part of the initiating application, while session endpoint 148 is part of the targeted application.

At step 201, step 202, and step 203, a secure single-hop session may be established. At step 201, the secure single-hop session is between session manager 145 and session credential function 147. At step 202, the secure single-hop session is between session manager 145 and session endpoint 140. At step 203, the secure single-hop session is between session manager 145 and session endpoint 148. The secure single-hop sessions of step 201, step 202, and step 203 may be established by conventional service layer bootstrap and registration procedures supported in architectures such as ETSI M2M and OMA LWM2M.

At step 204, session endpoint 140 may query session manager 145 (e.g., provide a session credential bootstrap request) to discover other session endpoints that are available and their corresponding attributes or request a particular session endpoint. An alternative to explicitly discovering other session endpoints is for session endpoint 140 to provide information within the bootstrap request of step 204, such as the type of session endpoints it wishes to establish a session with and let the session manager decide the best session endpoint. A session credential bootstrap request may be initiated by a session endpoint that is associated with an application, gateway, server, or the like, that wants to establish a service layer session. The session credential bootstrap request may contain information, such as one or more targeted session endpoints that the initiating session endpoint is looking to establish a service layer session with. In addition, the session credential bootstrap request may contain information with regard to a desired type of session endpoint, which a session manager may use to select one or more targeted session endpoints to distribute service layer session credentials. The session credential bootstrap request may also include information such as the required QoS of the session, location of a targeted session endpoint, and amount that the initiating application is willing to pay, among other things.

At step 205, session manager 145 parses the session credential bootstrap request of step 204 to determine the targeted session endpoints it is permitted to distribute a session credential to, or alternatively, which session endpoints it may ask to bootstrap with session credential function 147. In addition, session manager 145 determines any intermediate service layer instances (e.g., M2M gateways or M2M servers with service layer instances) that may be involved in the service layer session. The determination of the targeted session endpoints and intermediate service layer instances may be performed in different ways. For example, session manager 145 may use information included with the session credential bootstrap request at step 204, such as a list of targeted session endpoints. Alternatively, history or context information maintained as session state by the requesting session endpoint (e.g., session endpoint 140) or session policies may also be used. Using the session state, session manager 145 may further qualify which targeted session endpoints it selects to distribute session credentials to.

With continued reference to FIG. 4, at step 206, session manager 145 may send an E2E M2M session credential request to session credential function 147. The credential request of step 206 may include a request to allocate a set of session credentials for the determined targeted session endpoints and the determined service layer instances of step 205. At step 207, session credential function 147 creates a set of session credentials for session manager 145, session endpoint 148, and session endpoint 140. Additionally at step 207, credential function 147 maintains a state of the session credentials. The credential state may be sent to any application, instance, or the like that may desire session credentials of an already created service layer session. At step 208, session credential function 147 sends to session manager 145 an E2E M2M session credential response. The session credential response may include a session credential that may be allocated to any number of applications or service layer instances. Alternatively, the credential response may include a set of session credentials, each session credential in the set of session credentials may be particularly assigned to service layer instance or application that is involved the service layer session that is desired to be created.

At step 209, upon receiving the session credentials of step 208, session manager 145 may store the session credentials locally such that session manager 145 may also use the session credentials. For example, session manager 145 may encrypt or decrypt application data flowing through the service layer instance (e.g., service layer instance 123) and provide value-add data services. At step 210, session manager 145 sends to session endpoint 148 an E2E session credentials configuration request, which may include the session credentials of step 208. The E2E session credentials configuration request may also include a request for the ability of session endpoint 148 to participate in service layer session with session endpoint 140. For example, the session endpoint 148 may have policies in place that may not allow for service layer session at that time. At step 211, session endpoint 148 maintains session credential state for the proposed session. At step 212, session endpoint 148 sends to session manager 145 an E2E session credentials configuration response, which may include confirmation of receiving and implementing the sent session credentials.

With further reference to FIG. 4, at step 213, session manager 145 may send to session endpoint 140 an E2E security credential bootstrap response. E2E security credential bootstrap response of step 213 may ultimately be in response to the request of step 204 and may include the session credentials, as well as a list of targeted session endpoints with the session credentials for a service layer session. At step 214, upon receiving the session credentials, session endpoint 140 may maintain the state information of the received credentials.

With continued reference to FIG. 4, the session endpoints (e.g., session end point 140 and session endpoint 148) may need to repeat the bootstrapping operation periodically in order to refresh the session credentials. This periodic refresh may be based on a lifetime associated with the session credential. Securely bootstrapping with the common session credentials may establish a secure chain of trust between the initiating session endpoint 140, local session manager 145 (directly registered session manager for session endpoint 140), any intermediate service layer session managers (not shown here, but at times may be applicable), and one or more targeted E2E M2M service layer session endpoints (e.g., session end point 148). This secure E2E chain of trust may be layered upon the secured underlying conventional single-hop M2M service layer sessions as well as the secured underlying transport layer and access network connections that may exist. Alternatively, the aforementioned secure E2E chain of trust may be established by having each session endpoint and session manager authenticate with the session credential function rather than with one another in a hop-by-hop fashion.

Figure 25A:
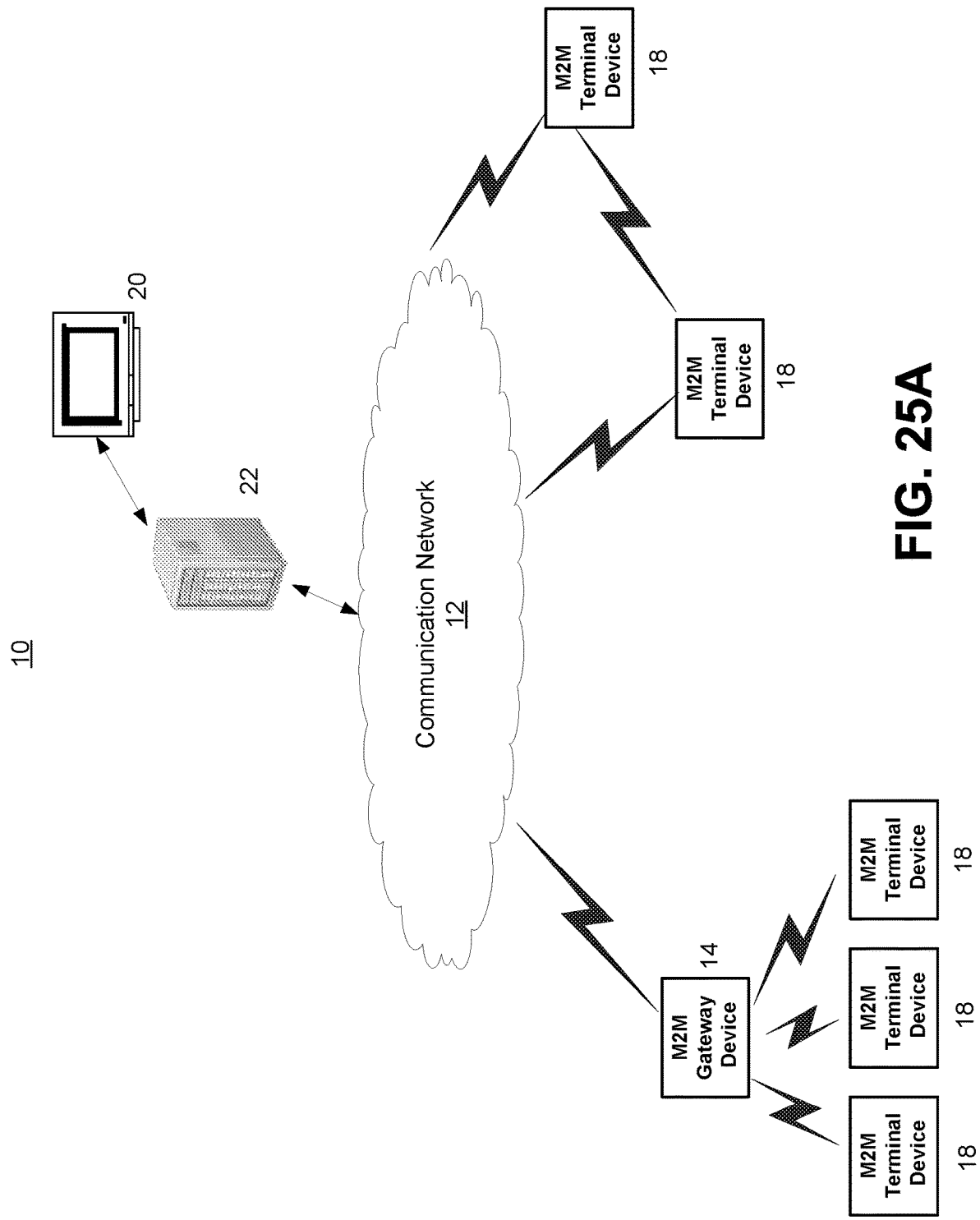
FIG. 25A is a system diagram of an example machine-to-machine (M2M) or Internet of Things (IoT) communication system in which one or more disclosed embodiments may be implemented.
Figure 25B:
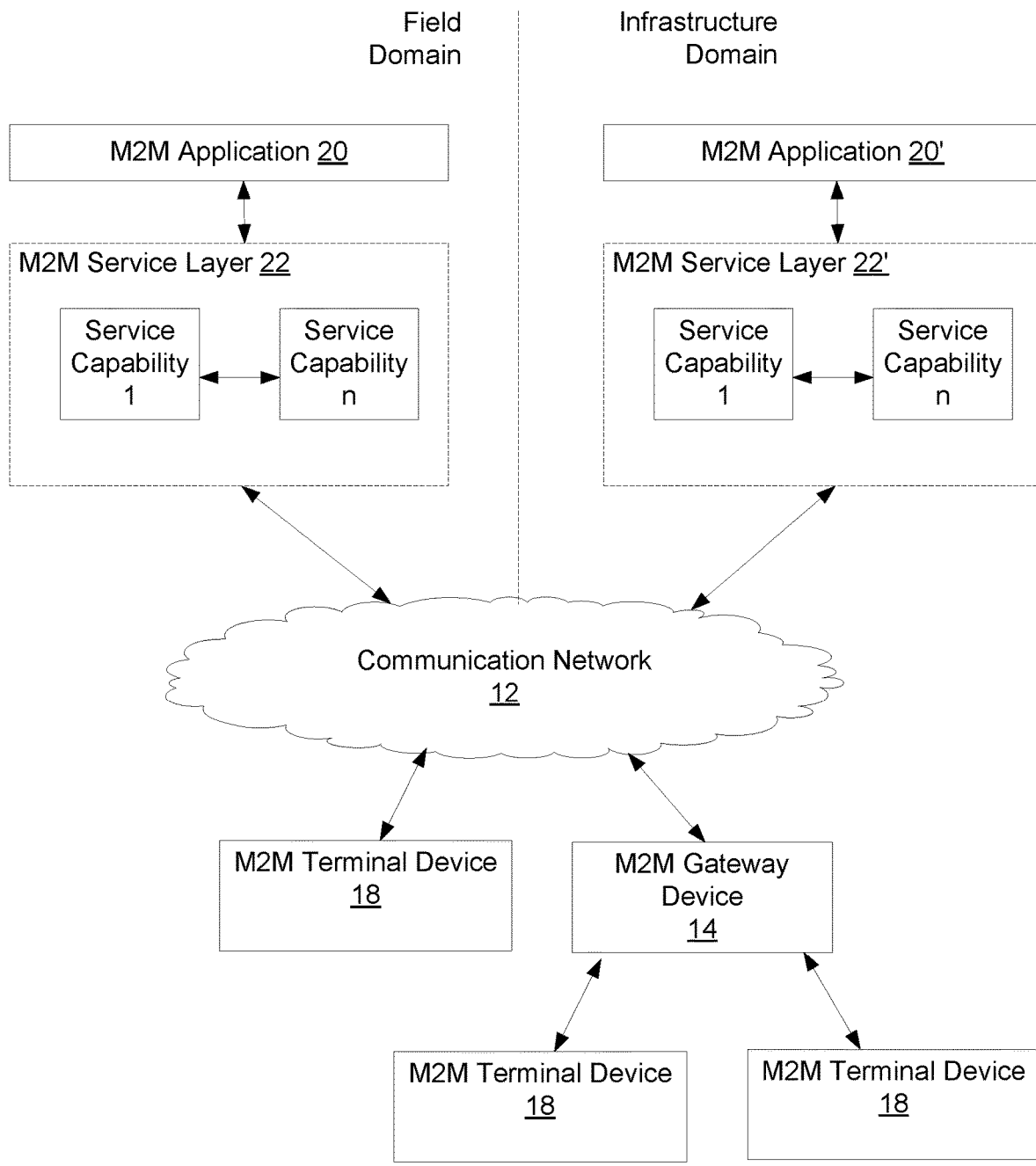
FIG. 25B is a system diagram of an example architecture that may be used within the M2M/IoT communications system illustrated in FIG. 25A.
Figure 25C:
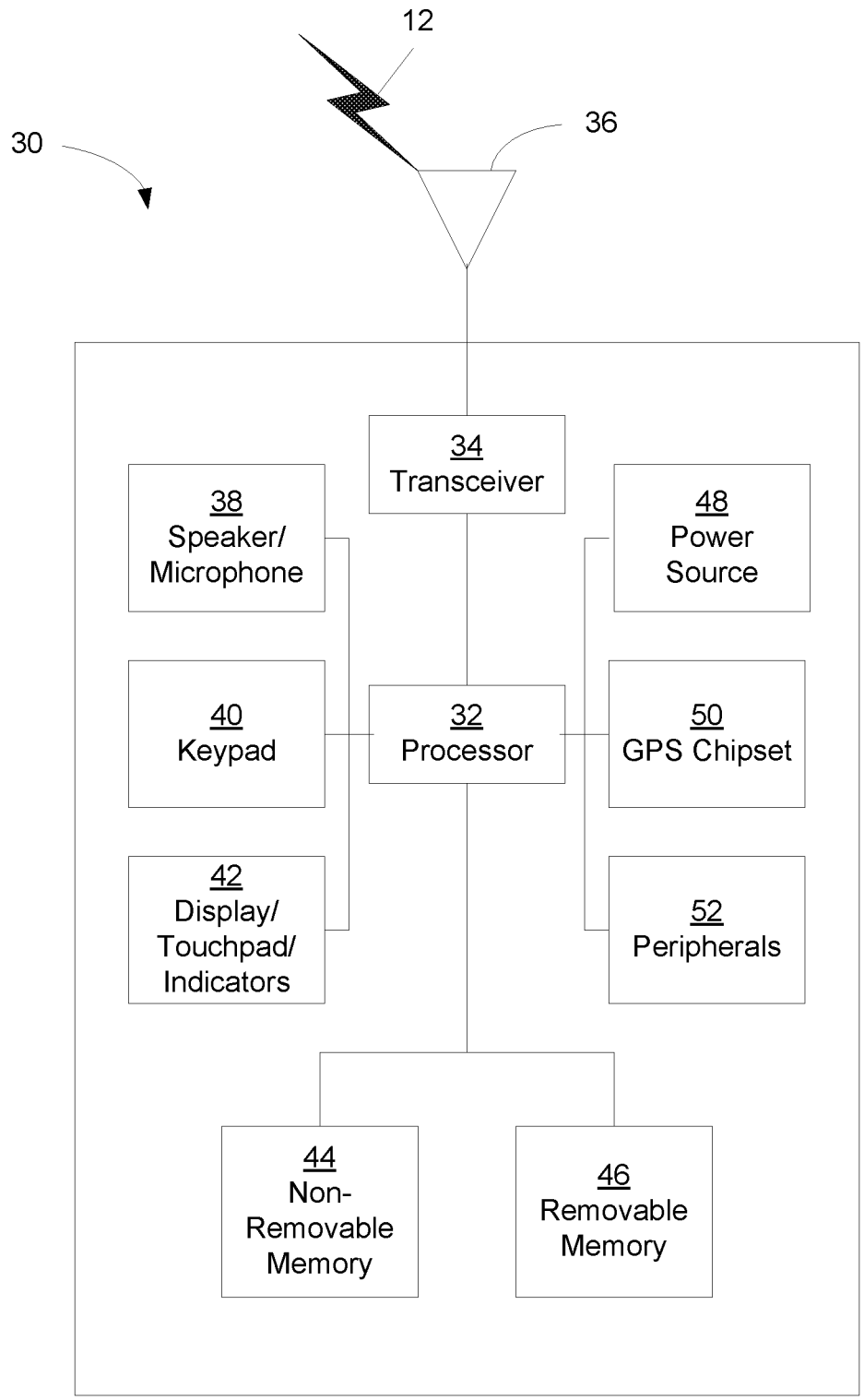
FIG. 25C is a system diagram of an example M2M/IoT terminal or gateway device that may be used within the communications system illustrated in FIG. 25A.
Figure 25D:
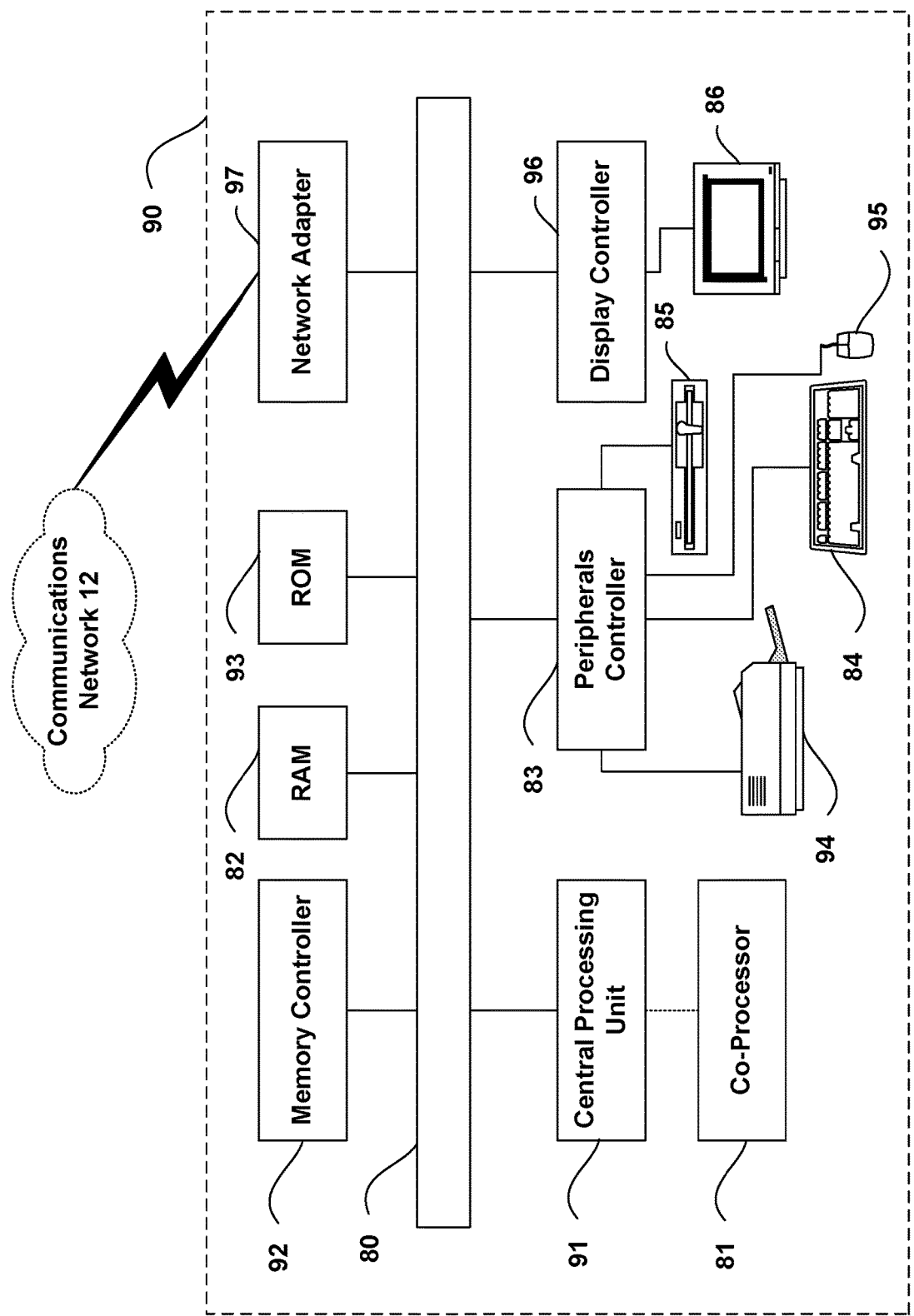
FIG. 25D is a block diagram of an example computing system in which aspects of the communication system of FIG. 25A may be embodied.

It is understood that the entities performing the steps illustrated in FIG. 4 are logical entities that may be implemented in the form of software (i.e., computer-executable instructions) stored in a memory of, and executing on a processor of, a device, server, or computer system such as those illustrated in FIG. 25C or FIG. 25D. That is, the method(s) illustrated in FIG. 4 may be implemented in the form of software (i.e., computer-executable instructions) stored in a memory of a computing device, such as the device or computer system illustrated in FIG. 25C or FIG. 25D, which computer executable instructions, when executed by a processor of the computing device, perform the steps illustrated in FIG. 4.

Session credentials may be bootstrapped to the initiating M2M application, as well as to the M2M service layer instance it is registered to, as well as one or more targeted M2M applications. The credentials may also be bootstrapped to other M2M service layer instances, based on service layer routing policies, context information, or history information (e.g. if other M2M service layer instances exist in a multi-hop path between the initiating M2M application and the targeted M2M application).

Figure 5:
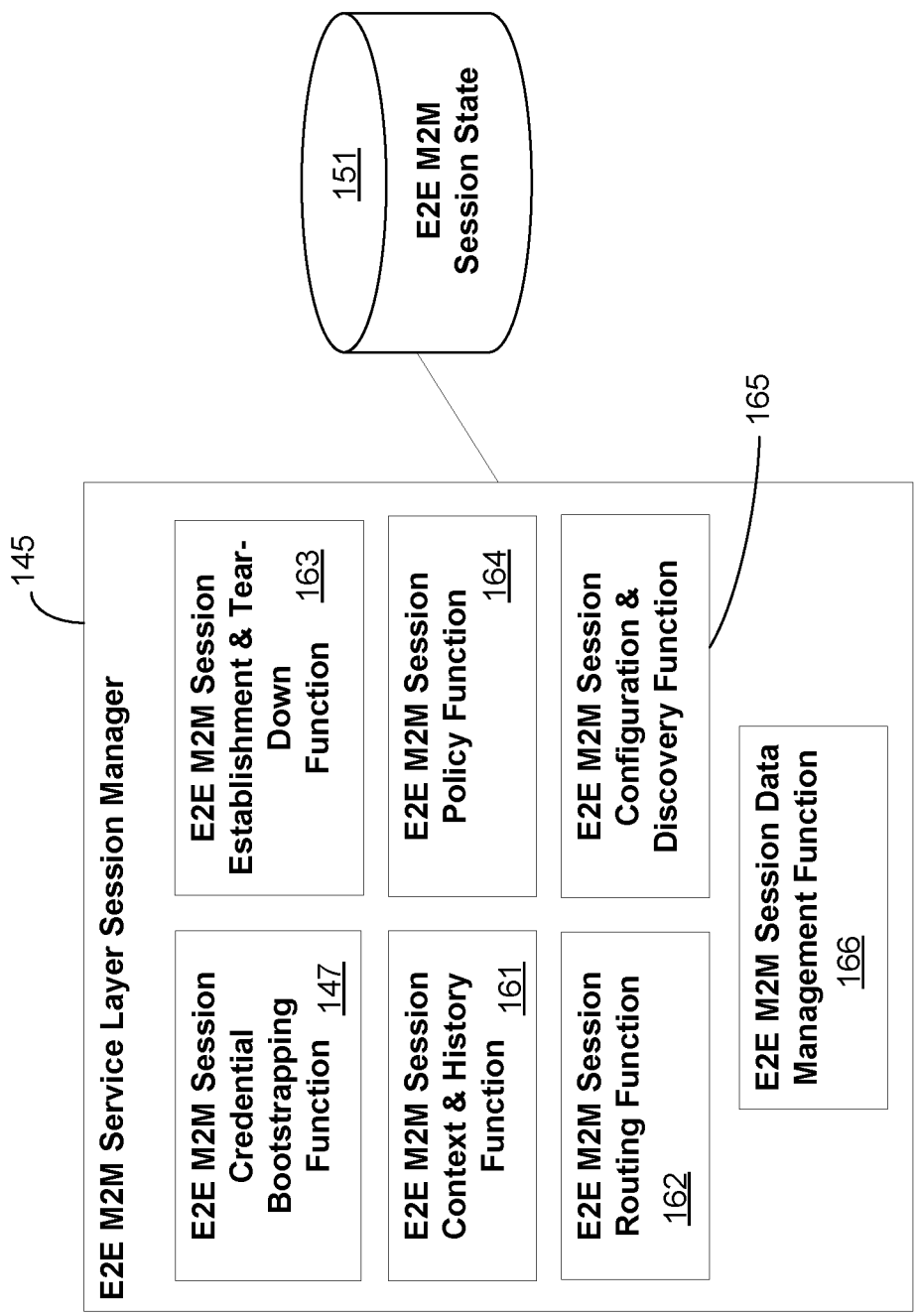
FIG. 5 illustrates a functional architecture for an E2E M2M service layer session manager.

FIG. 5 illustrates a functional architecture for an E2E M2M service layer session manager (e.g., session manager 145). As shown in FIG. 5, session manager 145 may include a session credential function 147, an E2E M2M session context and history function 161 (session context function), an E2E M2M session routing function 162 (session routing function), an E2E M2M session establishment and teardown function 163 (session establishment function), an E2E M2M session policy function 164 (session policy function), an E2E M2M session configuration and discovery function 165 (session configuration function), an E2E M2M session data management function 166 (session data management function), and a session state 151. In an embodiment, session manager 145 may be supported as a capability of an M2M service layer instance (e.g., service layer instance 123). In another embodiment, session manager 145 may be supported as a separate service (e.g., a standalone Web service), which an M2M service layer instance may interface with. Discussed in more detail herein are descriptions of each of the functions of the session manager.

E2E M2M session establishment and teardown function 163 (session establishment function) processes requests for establishing or tearing down service layer sessions. A session endpoint may send requests to session establishment function to establish a service layer session with one or more targeted session endpoints. If credentials have been successfully bootstrapped or provisioned or if security is not required then session establishment function may proceed with establishing or tearing down a service layer session when requested. An E2E M2M service layer session can be established by layering a service layer session over top of existing single-hop M2M service layer sessions or transport layer sessions. This can be achieved by maintaining and/or distributing session state for each session endpoint as well as for each intermediate session manager along the service layer session path. This session state may include information such as the session security credentials, session routing information, session context, and session policies. Configuration of session state on each session endpoint and session manager may be managed by a designated session manager (e.g., the session manager closest to the session endpoint that initiates a service layer session establishment request).

Figure 6:
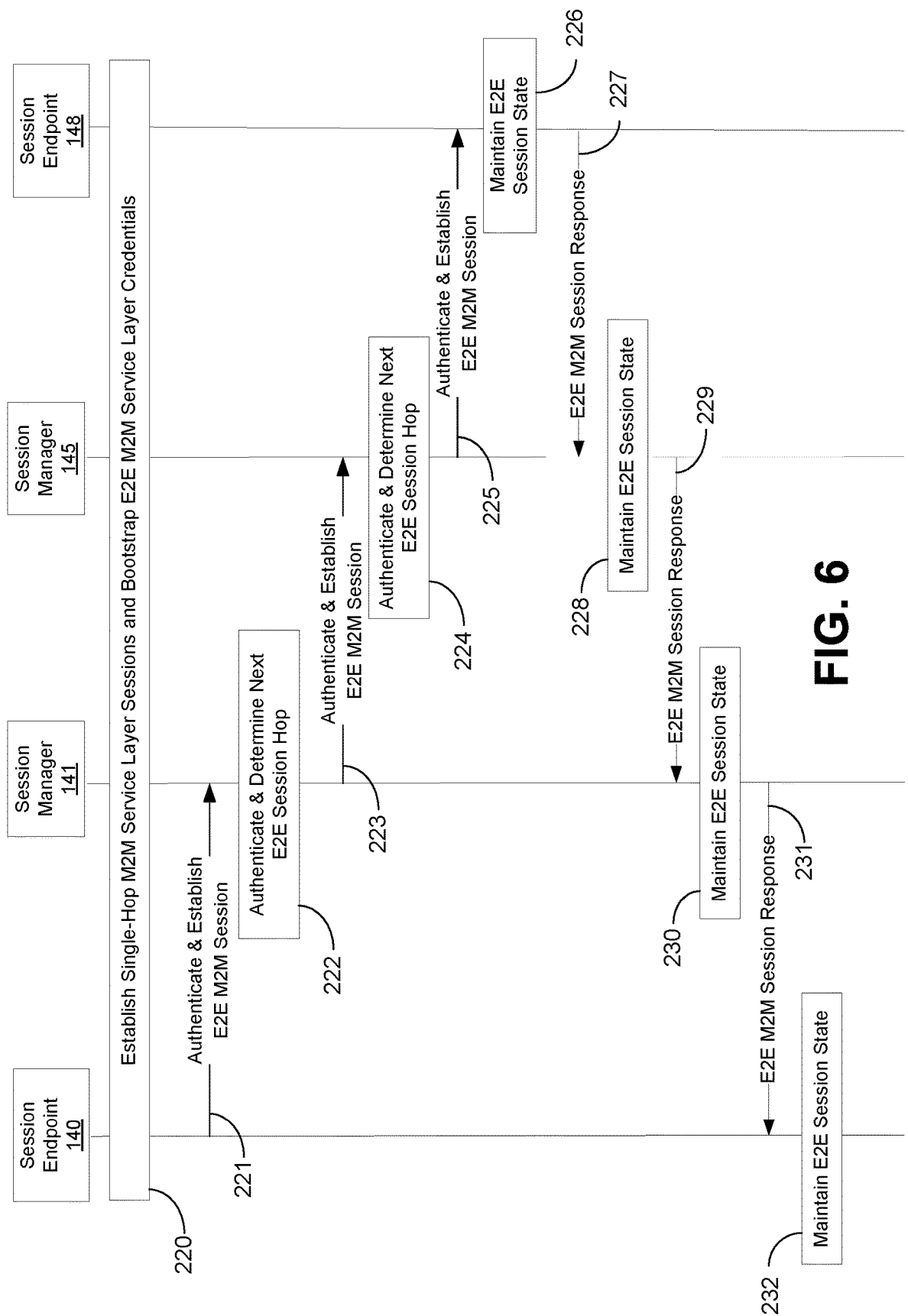
FIG. 6 illustrates an exemplary E2E M2M service layer session establishment call flow.

FIG. 6 illustrates an example E2E M2M service layer session establishment call flow. In this example, session endpoint 140 initiates a service layer session with session endpoint 148 that is three service layer hops away (i.e., separated by two M2M service layer instances). At step 220, session endpoint 140, session endpoint 148, and the session managers (e.g., session manager 141 and session manager 145) have been bootstrapped or provisioned with E2E M2M service layer session credentials, as described herein (see example regarding FIG. 4). At step 221, session endpoint 140 sends to session manager 141 a request to authenticate and establish a service layer session. The request of step 221 may include session credentials received at step 220. In an embodiment (not shown) session endpoint 140 may send multiple requests to one or more session managers to establish an E2E M2M service layer session with multiple targeted session endpoints (e.g., a group session).

At step 222, session manager 141 authenticates session endpoint 140 based on the session credentials of session endpoint 140. In addition, at step 222, session manager 141 determines the next hop to forward the request to authenticate and establish the service layer session. Session manager 141 determines the next hop based on information contained in the request, locally stored context and polices, and by collaborating with other session managers in a network. In this example, the next hop is another session manager (e.g., session manager 145). As shown in FIG. 6, at step 223, session manager 141 sends to session manager 145 a request to authenticate and establish the service layer session. The request of step 223 may include session credentials received at step 220. At step 224, session manager 145 authenticates session manager 141 based on the session credentials of session manager 141 and determines the next hop to forward the request to authenticate and establish the service layer session. At step 225, session manager 145 sends to session endpoint 148 a request to authenticate and establish the service layer session, as similarly done at step 221. At step 226, session endpoint 148 authenticates session manager 145 based on the session credentials, determines that session endpoint 140 desires to communicate with it, and authenticates the session endpoint 140 based on the session credentials. Also at step 226, session endpoint 148 may store session state information, which is described in more detail below.

At step 227, session endpoint 148 sends to session manager 145 an E2E session response. The E2E session response of step 227 may include a response confirming the establishment of a service layer session with session endpoint 140, as well as other service layer session state information. The E2E session response of step 227 is continually forwarded to session endpoint 140 at step 229 and step 231. As the response of step 225 is forwarded back for each hop, service layer session state information is stored by each session manager at step 228 and step 230, as well as the initiating session endpoint (session endpoint 140) at step 232. This service layer session state information is used to maintain the service layer session such that the service layer session may be used to exchange messages E2E between the session endpoints via the session managers.

With continued reference to FIG. 6, a session manager (e.g., session manager 141 or session manager 145) may dynamically change the routing path of service layer session messages. For example, if the single-hop session between session manager 141 and session manager 145 breaks down, then the upstream session manager, which is session manager 141 in this case, may recover by establishing a new single-hop service layer session with another neighboring session manager (if available) that happens to have an established single-hop session with the targeted session endpoint (e.g., session endpoint 148). See below for further details on E2E M2M service layer session routing. In addition, although not shown in FIG. 6 (see FIG. 3), an alternative to session endpoints and session managers authenticating with one another is for them to authenticate directly with a session credential function in the network instead. A trusted session credential function could be a central node in the network in which session endpoints and session managers can authenticate with. By doing this they can be authenticated by this function rather than by each other.

Tear-down of a service layer session may work in a similar fashion by removing service layer session state information on the session endpoints and session managers. During a tear down of the service layer session, service layer session state information may be deleted starting at the target session endpoint towards the initiating session endpoint, which also removes service layer session state information on each session manager. It is understood that the entities performing the steps illustrated in FIG. 6 are logical entities that may be implemented in the form of software (i.e., computer-executable instructions) stored in a memory of, and executing on a processor of, a device, server, or computer system such as those illustrated in FIG. 25C or FIG. 25D. That is, the method(s) illustrated in FIG. 6 may be implemented in the form of software (i.e., computer-executable instructions) stored in a memory of a computing device, such as the device or computer system illustrated in FIG. 25C or FIG. 25D, which computer executable instructions, when executed by a processor of the computing device, perform the steps illustrated in FIG. 6.

Figure 7:
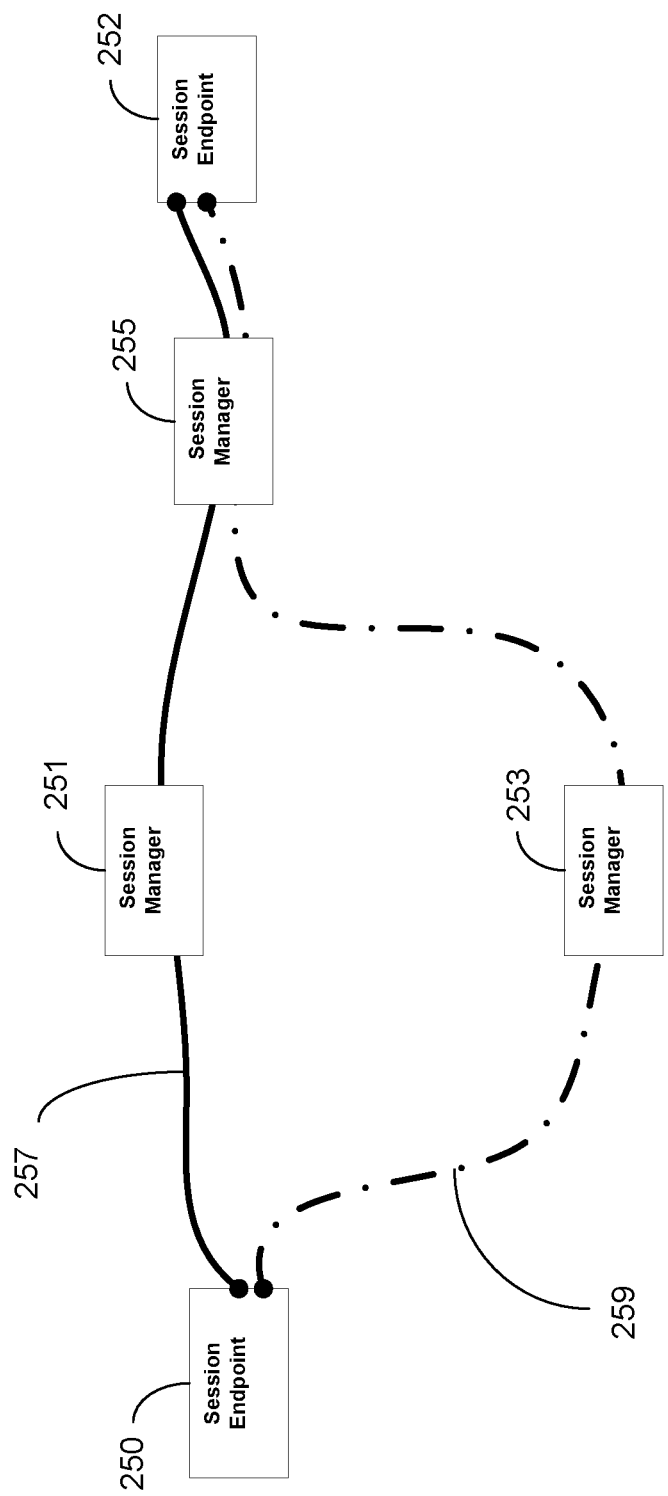
FIG. 7 illustrates an exemplary service layer session between two session endpoints with multiple routes.

Discussed here are more details with regard to E2E M2M service layer session routing (session routing), as also shown in the functional architecture of FIG. 5. FIG. 7 illustrates an exemplary single service layer session between two session endpoints that has multiple service layer session routes between the service layer session endpoints.

Each E2E M2M service layer session route may consist of a different series of single-hop M2M service layer sessions, which interconnect the M2M session endpoints and M2M session managers with one another. FIG. 7 illustrates one service layer session that may take multiple routes, such as route 257 (i.e., solid line) or route 259 (i.e., dotted lines). Multiple service layer session routes between session endpoint 250 and session endpoint 252 may provide redundancy, fault protection, and even different levels of quality of service. Session manager 251, session manager 253, and session manager 255 may support an E2E M2M service layer session routing function (session routing function) to route messages associated with the designated service layer session to one of multiple supported session routes. The session routing function may support context awareness as well as policy based routing. For example, the session routing function of session manager 255 may load balance a designated service layer session across different session paths by keeping a history of past messages and the routes chosen for these messages. The session routing function of session manager 255 may adapt service layer routes based on loading conditions or faults, which may provide better resiliency and QoS. The session routing function may support interfacing with underlying access networks to share information, such that the information may be taken into account for service layer routing decisions as well as underlying access network routing decisions.

Another form of session routing that may be supported is routing between multiple underlying transport sessions or access network connections that may be associated with a service layer session. To support this, service layer session manager 255 may have an interface to underlying transport/access network routing functions. For example, an M2M device or M2M gateway may support multiple radio access technologies (e.g., Wi-Fi, Cellular, etc.). An E2E service layer session may be layered over top of multiple single hop M2M service layer sessions. Each single hop service layer session may have multiple underlying transport or access network connections associated with it. Service layer session manager 255 may collaborate with underlying transport or access network routing functions to manage the routing and selection of the underlying transport or access network connection to use on a single-hop by single-hop basis.

With continued reference to FIG. 7, alternatively, a service layer may collaborate with underlying network routing functions to manage the routing and selection of which underlying transport or access network connection to use on an E2E basis. In doing so, security and QoS may be managed in an E2E fashion rather than just on a hop-by-hop basis. For example, this E2E management may be performed by distributing routing policies from the session manager (e.g., session manager 255) responsible for establishing the service layer session to the rest of the session managers (e.g., session manager 251 and session manager 253) associated with the designated service layer session. E2E management enables routing optimizations that may be challenging to support with single-hop routing. For example, if the device hosting the session endpoint 250 comes into close proximity to the device hosting the session endpoint 252, then E2E routing optimizations may be dynamically performed. In another example, instead of routing service layer session messages from one application to another application through both an M2M server and M2M gateway, E2E routing optimization may be performed to optimize an E2E route by routing the service layer session messages through a shared M2M gateway in close proximity to both applications or even establish a direct peer-to-peer route between the applications.

Below are further details with regard to the functional architecture as shown in FIG. 5. The functional architecture may be implemented on a single device or distributed across multiple devices. E2E M2M service layer session context and history function (session context function) 161, shown in FIG. 5, may collect, interpret, share, and process E2E M2M service layer session context and history information. Session managers and session endpoints may leverage session context information to make context aware decisions with regards to the use and management of service layer sessions. In addition, session context information may be leveraged for purposes such as billing and charging, as well as history and tracking. The session context function 161 also supports sharing of session context information between sessions managers and/or endpoints.

Some forms of E2E M2M service layer session context information may include one or more of the following: 1) past service layer session routing decisions; 2) dynamically changing cost or pricing information related to service layer sessions and the underlying transport and access network connections that are leveraged; 3) location of M2M devices and gateways associated with service layer sessions; 4)

access network congestion information and available bandwidth for access network connections associated with service layer sessions; and 5) availability of M2M devices and gateways associated with a designated service layer session (e.g., whether or not an M2M device or gateway is sleeping or not)

Some context aware service layer session related decisions may include one or more of the following: 1) context aware session routing; 2) context aware service layer session load balancing; 3) context aware service layer session store and forwarding of messages (e.g., while session endpoints are unavailable); and 4) context aware service layer session proactive pre-fetching and caching of data from session endpoints and caching it within the service layer for more efficient access.

FIG. 5 also shows an E2E M2M service layer session policy function (session policy function) 164. Session policy function 164 supports session policy configuration, management, and sharing. With the use of service layer session policies, session managers may more intelligently manage service layer session communication between session endpoints. In addition, session policy function 164 supports sharing of service layer session policies between session managers or session endpoints. Some service layer session policies may include, one or more of the following: 1) session routing policies; 2) E2E M2M service layer session store-and-forward policies; 3) service layer session pre-fetch policies; 4) service layer session establishment policies; 5) service layer session tear-down policies; 6) session context policies that determine the context to collect, how to interpret context, how to factor context into decision making, etc.; and 7) service layer session security policies that may control authorization and access controls to information associated with session.

FIG. 5 also shows an E2E M2M service layer session configuration and discovery function 165 (session configuration) supports configuration and discovery capabilities for E2E M2M service layer session attributes and parameters. Configuration of service layer session attributes and parameters may be used to control and customize a service layer session during establishment as well as during normal service layer session operation. Discovery of service layer session state information may be used to find available service layer sessions based on a desired set of criteria. This may help M2M applications and M2M service layer instances find existing service layer sessions already in progress or candidates that support service layer sessions along with corresponding session criteria or attributes. Some types of E2E M2M service layer session configuration and discovery may include one or more of the following: 1) configuration of service layer session state hosted on a session endpoint by a session manager and vice versa; 2) configuration of service layer session state hosted on a session manager by another session manager; 3) discovery of service layer session state hosted on a session manager by a session endpoint and vice versa; and 4) discovery of service layer session state hosted on session manager by another session manager.

FIG. 5 also shows an E2E M2M session data management function 166 (session data management function) that may support management of data contained within service layer session messages that are processed by a service layer instance. Leveraging session credentials that have been bootstrapped into the service layer instance, this function supports decryption of data contained within received service layer session messages and encryption of service layer session data that is contained within service layer session messages forwarded to service layer instances and applications. Once the data is decrypted, this function supports interfacing and passing this data to other functions in the service layer instance such as data analytics function, data aggregation function, or data mash-ups, among other things. Supporting these types of functions on intermediate M2M service layer instances enables these service layer instances to support value-add data services on messages flowing through the network, which may make the network more efficient and help reduce the complexity of session endpoint applications as well.

FIG. 5 also shows an E2E M2M session state 151 (session state) which may include one or more of the following: E2E M2M service layer session identifier (session identifier), E2E M2M service layer session security credentials (session security credentials), E2E M2M service layer session descriptor (session descriptor), E2E M2M service layer session routing information (session routing information), E2E M2M service layer session context or history (session context), and E2E M2M service layer session policies (session policies). A session identifier may be used by a session manager and session clients (e.g., session applications or service layer instances) to identify a service layer session. The session identifier may be an arbitrary and unique alpha-numeric string that can optionally be hashed using session credentials such that it can only be encrypted/decrypted by its corresponding session managers, session endpoints, and session credential function.

A session identifier may also be a descriptive alpha-numeric string that is indicative of the corresponding session type and/or the functionality associated with the session. This descriptive session identifier may be used for session discovery purposes and facilitate sharing of session info (for example, sensor123-Measurements, LightingABC-Control, etc.). The descriptive session identifier may help support dynamic formation of group sessions, as well. The descriptive session identifier may be optionally hashed using session credentials such that descriptive session identifier can only be encrypted/decrypted by its corresponding session managers, session endpoints, and session credential function.

A session identifier may recycle portions of other identifiers. Session endpoints typically support a unique identifier that is assigned to them. For example, an M2M application is allocated a unique application identifier when registering to an M2M service layer instance. Similarly an M2M service layer instance is either provisioned with a unique identifier or dynamically configured with one during a bootstrapping procedure. These unique identifiers may be used to create E2E M2M service layer session identifiers. Session endpoints may exchange unique identifiers with one another during session establishment and these unique identifiers may be concatenated to form a unique session identifier between the two session endpoints.

Session state may include security credentials associated with service layer sessions (for example, E2E security certificates, public keys, etc.) A service layer session may support an independent set of credentials (e.g., established and distributed by E2E M2M service layer session credential function) or it may optionally leverage security credentials from underlying sessions or connections. For example, security credentials from underlying single-hop M2M service layer sessions, transport layer sessions, and/or access network connections may be leveraged.

Session state may include session descriptor, which is information describing the session that may be used by existing session participants (e.g., session endpoints, session managers, or session credential function) or by prospective session participants to discover an existing service layer session. A session descriptor may be a description for each session participant (e.g. device identifiers, type of participant, services that participant supports, interface requirements of participant, type of compression used, etc.). A session descriptor may be description of each underlying single-hop session that is used to construct the service layer session (e.g., information regarding the individual single-hop M2M service layer sessions making up the multi-hop E2E M2M service layer session, information regarding underlying transport or access network connections, etc.).

Session state may include routing information. The session routing information may describe the next hop E2E M2M service layer session endpoint or session manager to route incoming session messages to. The following are forms of routing information that may be stored as a session state: a session identifier of an M2M application or M2M service layer instance; a single-hop M2M service layer session identifier; an application protocol identifier (e.g. a Uniform Resource Identifier (URI), Uniform Resource Locator (URL), Uniform Resource Name (URN), etc.); a transport layer session identifier (TLS session identifier); a network layer address (e.g. IP address); an access network identifier (e.g. International Mobile Subscriber Identity (IMSI), Mobile Subscriber Integrated Services Digital Network-Number (MSISDN), media access control (MAC) Address, etc.); or a list of available underlying network interfaces, access network connections/bearers, transport layer connections, etc.

Session state may include E2E M2M Service Layer Session Context/History, which may be context information related to and/or history of past service layer transactions performed using a service layer session. Examples include keeping track of the type, number, rate, size, etc. of resources targeted by the session endpoints or keeping track of the different service layer sessions that an application establishes (e.g. rate, type, etc.).

Session state may also include session policies that define rules for how an E2E M2M service layer session manager or endpoint generates or processes E2E M2M service layer session messages. For example, policies may include service layer QoS policies routing policies, service layer store-and-forward policies, service layer access control policies, etc. Policies may also be used to define how a session manager processes the data associated with a message (e.g., if the data is read-only or if the data can be aggregated with other data, etc.). Policies may also be used to define service layer routing rules for a session manager (e.g., some session must be routed through a specified session manager so that session manager can perform such functions as charging, security, tracking/inspection, etc.).

One or more of the following can maintain the disclosed session state: a session manager, a session endpoint, or a session credential function. The session state may be used for the setup, management, and tear down of service layer sessions. Session state may be dynamically created. For example, session identifiers may be included in each message to correlate the message with a particular service layer session. Session endpoints or session managers may create and store session state based on message they send or receive and index this state based on the session identifier. A service layer session manager, for example, may store this state and factor it into future proactive or autonomous service layer decisions that it makes such as session routing decisions, session store-and-forward decisions, or autonomous service layer actions such as pre-fetching of data based on prior history, patterns, or trends.

A session endpoint may store session state in order to maintain a service layer session with a session manager. Session state may also be shared between session managers and/or endpoints. This session state may be maintained by the session endpoint itself or maintained by the session manager in a manner similar to Web Cookies. For example, session state may be updated/maintained on a session endpoint by a session manager while the endpoint is using the service layer session. In doing so, the session manager may store session state onto the session endpoint as an M2M session cookie. When the session endpoint uses the session in the future, this stored M2M session cookie can be sent to the session manager or retrieved by it and used by the session manager for awareness of the endpoint's prior activity. An M2M session cookie can include session state such as which specific resources an endpoint targeted in the past, the rate at which the resources were targeted, etc. Using this M2M session cookie, the session manager can more efficiently and proactively manage the current session transactions based on prior session activity of the endpoint. For example, the session manager can proactively trigger devices in advance to ensure they are awake, proactively reserve access network resources in advance, perform prefetching of targeted resources in advance such that they are cached/buffered in the service layer in advance, etc. Note the disclosed M2M session cookie concept may also be applicable to single-hop M2M service layer sessions, as well as E2E M2M service layer sessions.

Figure 8:
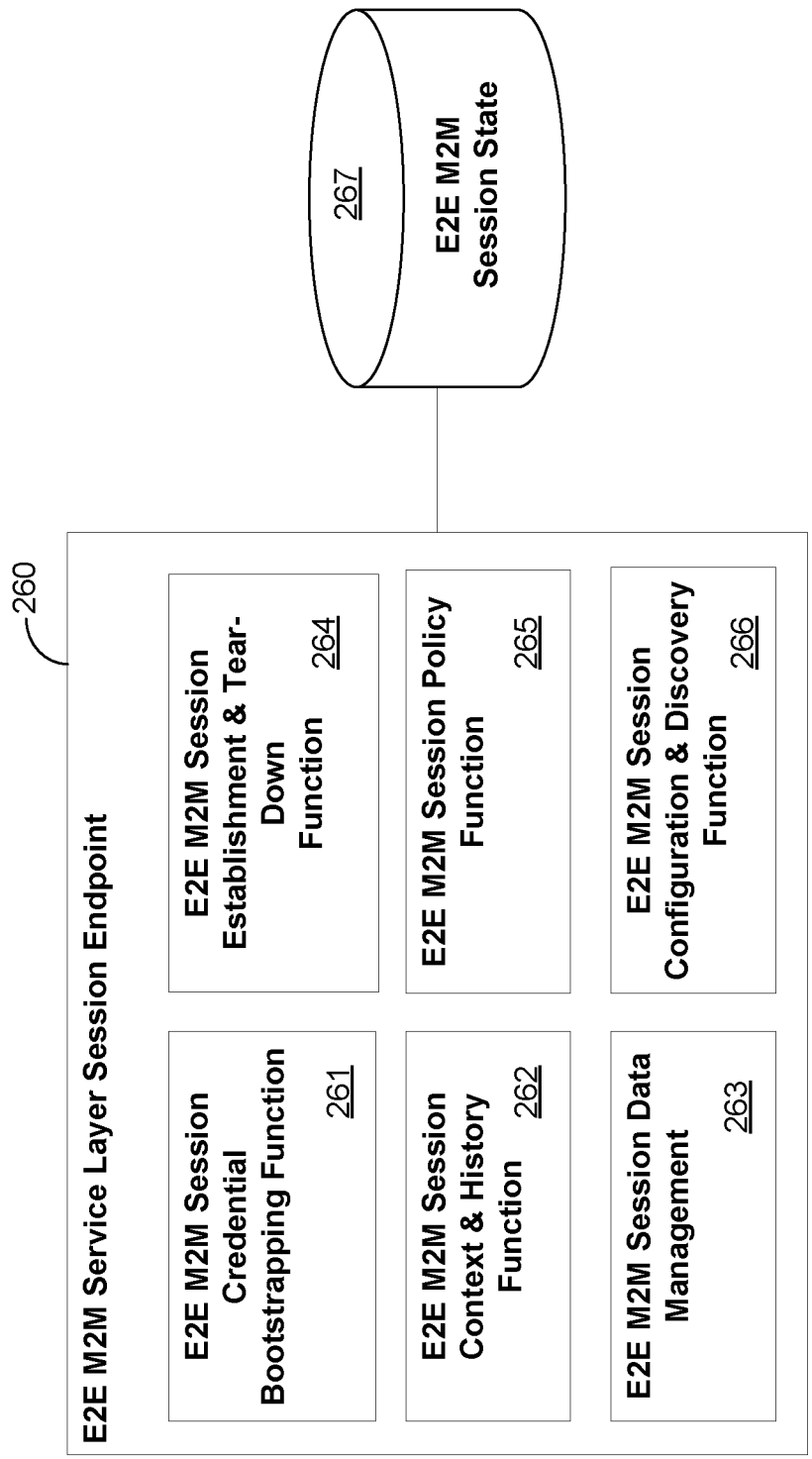
FIG. 8 illustrates a functional architecture for a session endpoint.

FIG. 8 illustrates a functional architecture for a session endpoint 260. As shown in FIG. 8, session endpoint 260 may include one or more of the following: an E2E M2M session credential bootstrapping function 261, an E2E M2M session context and history function 262, an E2E M2M session establishment and teardown function 264, an E2E M2M session policy function 265, an E2E M2M session configuration and discovery function 266, an E2E M2M session data management function 263, and an E2E M2M session state 267. Session endpoint 260 may be considered a logical entity that can be the source or sink of E2E M2M service layer session communication (service layer session communication). In general, session endpoint 260 has many of the same functions of the service layer session manager shown in FIG. 5. However in the case of the session endpoint 260 of FIG. 8, these functions may be streamlined and support a more limited set of functionality, particularly for session endpoints that reside on a resource constrained device, such as a thermostat.

With continued reference to FIG. 8, E2E M2M service layer session endpoint credential bootstrapping function 261 (session endpoint credential bootstrapping function) supports initiating E2E M2M service layer session bootstrap requests to a session manager and receiving corresponding responses containing session credentials. This functionality is used by service layer session endpoints that are looking to establish a service layer session with one or more target session endpoints. This disclosed function also supports receiving a bootstrap configuration request containing session credentials from a session manager when session endpoint 260 is a target of a session being initiated by another endpoint.

E2E M2M service layer session endpoint establishment and tear-down function 264 (session endpoint establishment function) supports initiating session endpoint establishment requests to a session manager. This function also supports receiving session establishment requests from a session manager when session endpoint 260 is a target of the session establishment or tear-down.

E2E M2M service layer session endpoint context and history function 262 (session endpoint context function) supports collecting, interpreting, and processing of E2E M2M service layer session context and history information in a similar manner as the corresponding function supported by a session manager as described above. Here, session endpoint 260 may not support context pertaining to routing and access network connectivity. These types of context may be better suited for session managers.

E2E M2M service layer session endpoint policy function 265 (session endpoint policy function) of FIG. 8, supports collecting, interpreting, and processing of E2E M2M service layer session policies in a similar manner as the corresponding function supported by a session manager as described with regard to the session managers herein. Here, session endpoint 260 may not support policies pertaining to routing, store-and-forwarding, pre-fetching, and access network connectivity. These types of context may be better suited for session managers. E2E M2M service layer session endpoint configuration and discovery function 266 (session endpoint configuration) supports configuration and discovery capabilities for service layer session attributes and parameters in a similar manner as the corresponding function supported by a session manager as described herein. E2E M2M session endpoint data management function 263 (session endpoint data management function) supports management of data that is contained within E2E M2M service layer session messages that are processed by session endpoint 260. In particular, this function may support the encryption or decryption of service layer session data using the session credentials.

The E2E M2M service layer session interface messages defined herein may be bound or layered on top of (i.e., encapsulated within) several underlying existing protocols such as transmission control protocol (TCP) and/or transport layer security (TLS) session, user datagram protocol (UDP)/datagram TLS (DTLS), hypertext transfer protocol (HTTP), constrained application protocol (CoAP). In doing so, session state can be shared and leveraged between the different sessions (e.g. security credentials, congestion information, etc.). In addition, a service layer session can support persistency with regards to lower layer sessions such that the service layer session can persist and be maintained independent of lower layer sessions being setup and torn-down. As one exemplary embodiment, E2E M2M service layer session control messages can be encoded as JSON or XML representations and carried within the payload of HTTP or CoAP messages. These HTTP and CoAP messages can in turn be encapsulated and carried by underlying TCP/TLS and UDP/DTLS messages, respectively.

FIG. 9-FIG. 24 below, provide details with regards to E2E M2M service layer sessions that may apply to oneM2M and other architectures. For additional context, according to the oneM2M RESTful architecture, capability service functions (CSFs) are represented as a set of "resources." A resource is a uniquely addressable entity in the architecture. A resource has a representation that may be manipulated via RESTful methods such as Create, Retrieve, Update, and Delete and is addressed using a Universal Resource Identifier (URI). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

Figure 9:
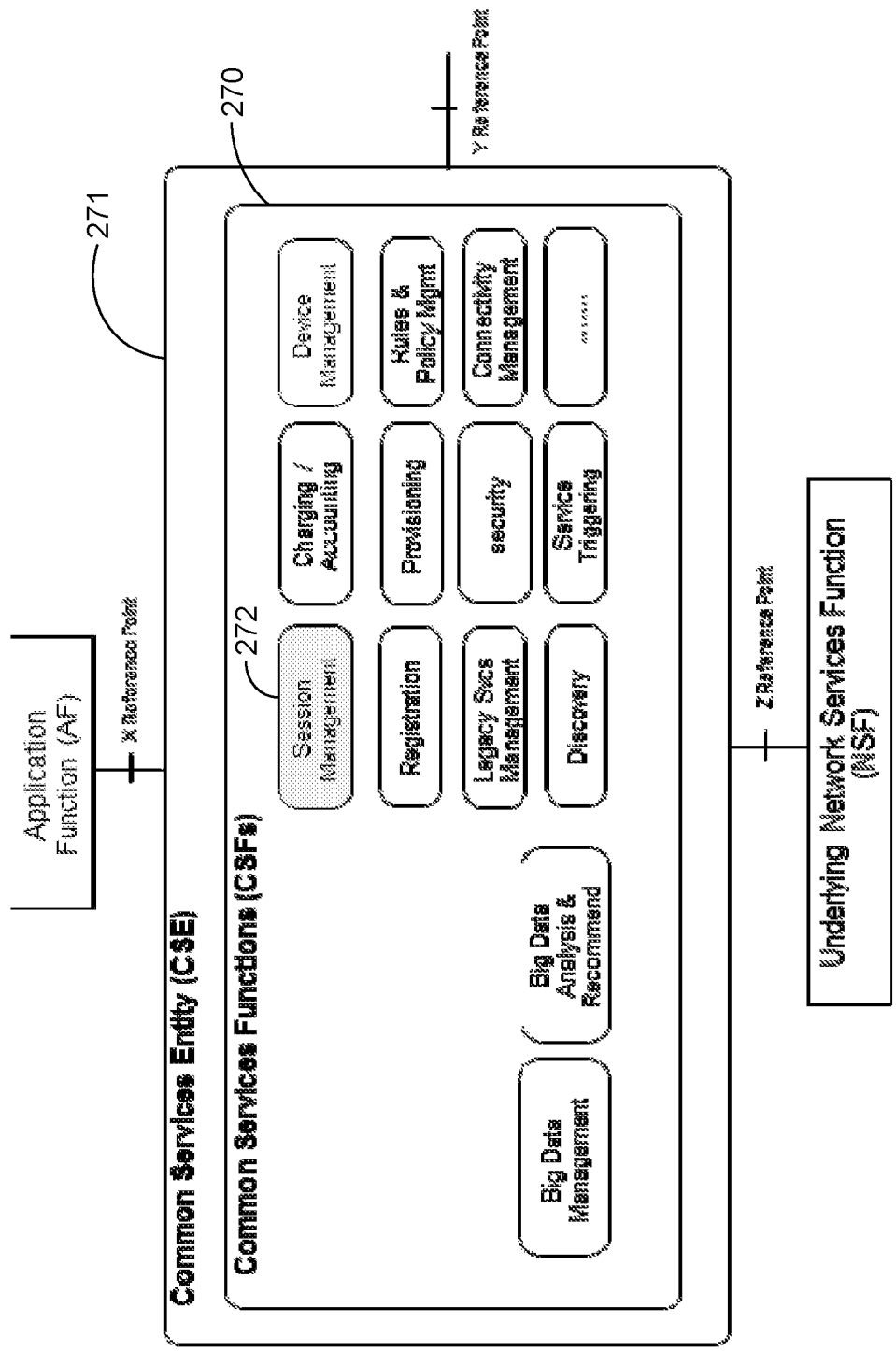
FIG. 9 illustrates a oneM2M embodiment of a session manager.

FIG. 9 illustrates a oneM2M embodiment of a session manager. oneM2M has definitions of capabilities supported by the oneM2M service layer. These capabilities may be referred to as capability service functions (CSFs), such as CSF 270. The oneM2M service layer is referred to as a capability services entity (CSE), such as CSE 271. The current version of the CSE has a placeholder for a Session Management (SMG) CSF; however, the details of this function have yet to be defined. In an embodiment, a session manager may serve as an oneM2M SMG CSF 272. SMG CSF 272 may manage service layer sessions between M2M Applications, between an M2M Application and a CSE, or between CSEs. AEs connect to CSEs via reference point X, while CSEs connect to other CSEs via reference point Y.

Figure 10A:
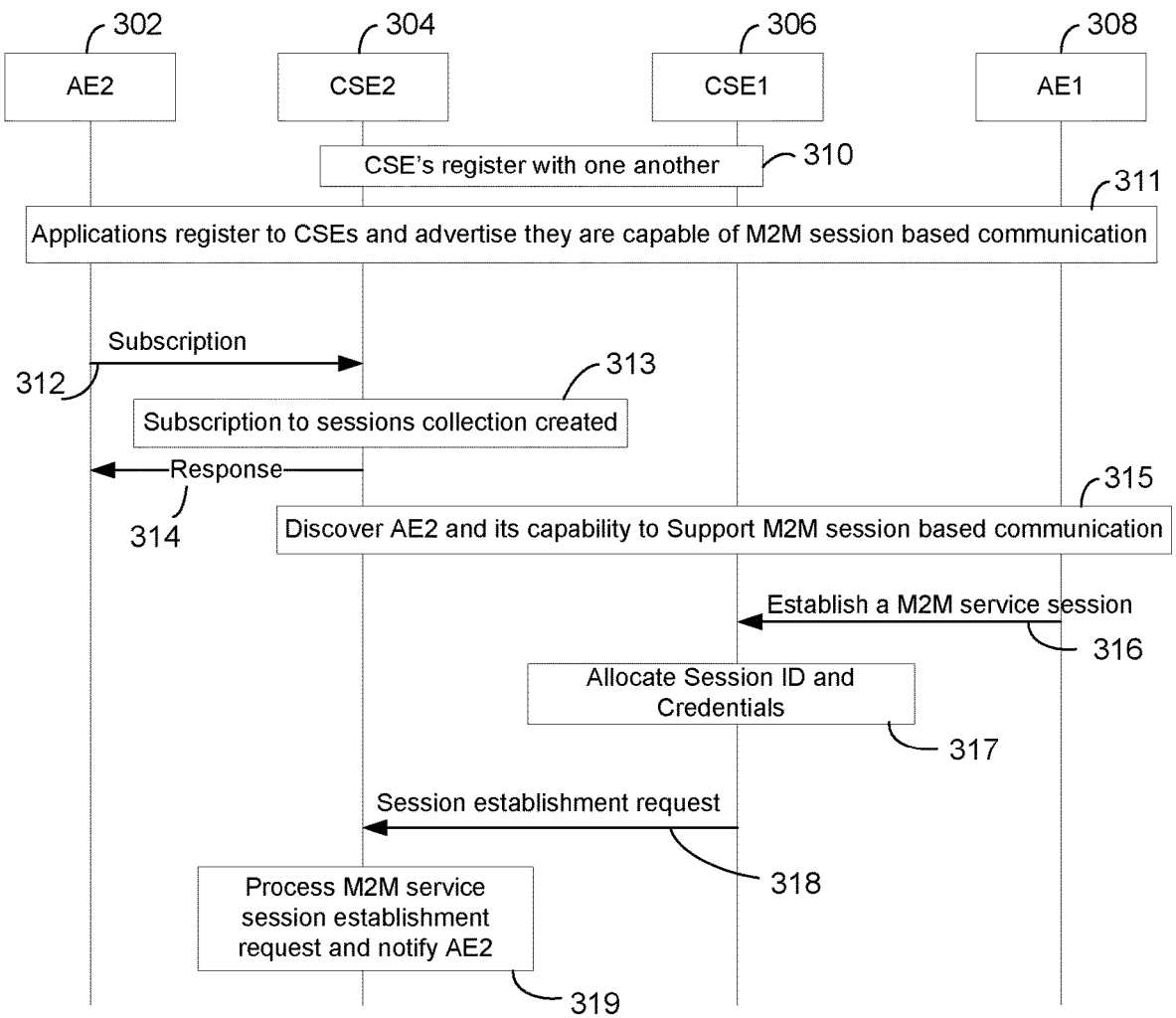
FIG. 10A illustrates an E2E M2M service layer session establishment procedure for a oneM2M session management (SMG) service.
Figure 10B:
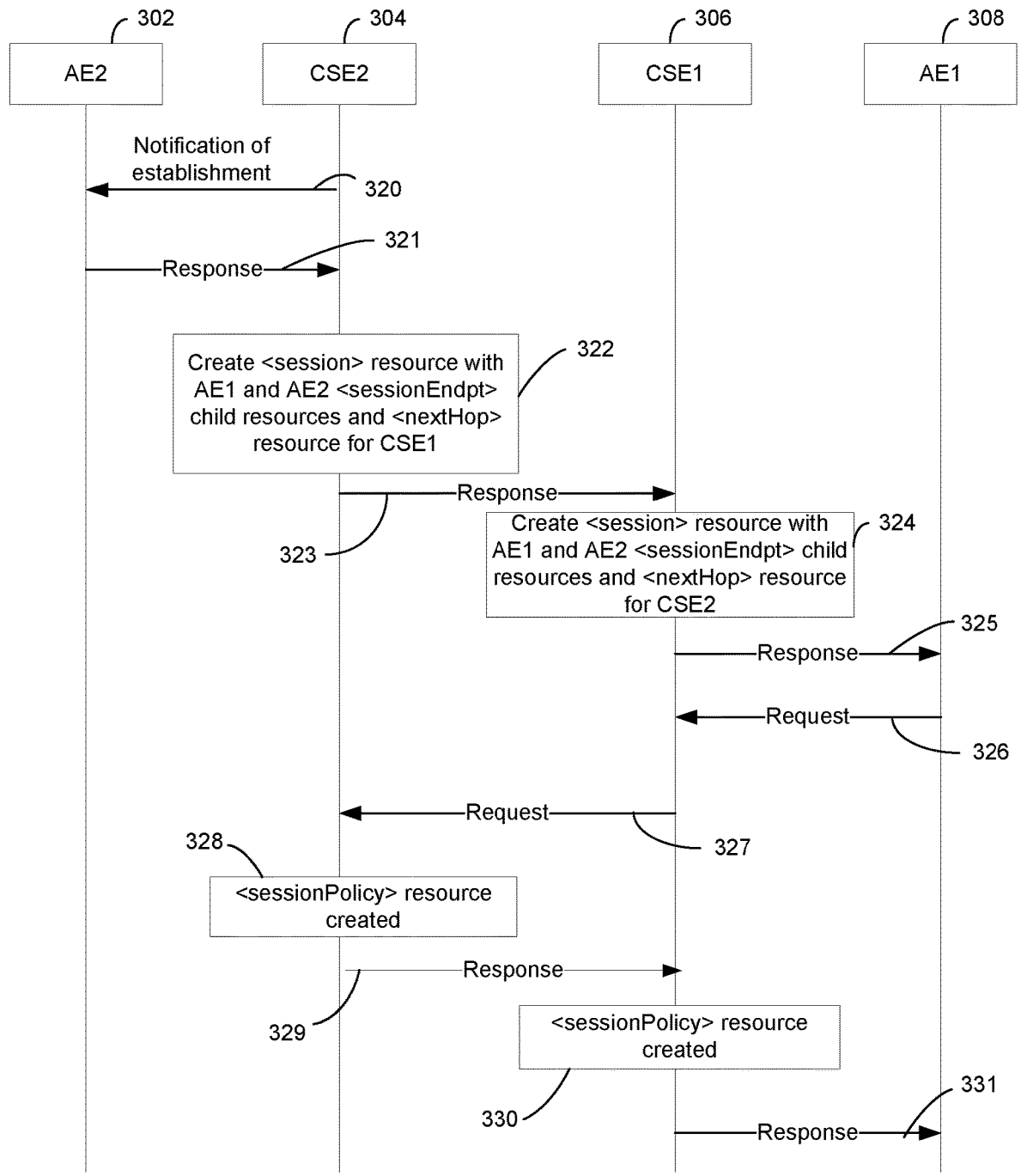
FIG. 10B illustrate an E2E M2M service layer session establishment procedure for a oneM2M session management (SMG) service continued from FIG. 10A.

FIG. 10A and FIG. 10B illustrate an E2E M2M service layer session establishment procedure for a oneM2M session management (SMG) service supporting the resources that are defined in more detail below. The procedure may be the following (not necessarily in the order shown). As shown in FIG. 10A, at step 310, CSE 306 and CSE 304 register with one another and exchange E2E M2M service session management (session management or SMG) capabilities with one another. At step 311, AE 308 and AE 302 register to CSE 306 and CSE 304, respectively, and advertise that they support E2E M2M session based communication (i.e., E2E M2M service layer session). oneM2M defines an application entity (AE) as a network node (e.g., M2M device) hosting an M2M application function. At step 312, AE 302 subscribes to the sessions collection resource hosted on CSE 304. Included in the subscription request may be a callback uniform resource identifier (URI) which notifications may be sent to. This may be done for the AE 302 to receive notifications when an M2M service session establishment request is received by CSE 304. This may be done via a CREATE request.

With continued reference to FIG. 10A, at step 313, CSE 304 creates a subscription to the sessions resource for AE 302. At step 314, CSE 304 return a positive response to the subscription CREATE request. At step 315, AE 308 discovers AE 302 and the capability of AE 302 to support E2E M2M session-based communication (i.e., E2E M2M service layer session). Step 315 may be based on a resource discovery request serviced by CSE 306 or CSE 304. Discovery results may include information such as the M2M identifiers (e.g., application ID, node ID, etc.) for AE 302, which AE 308 may use to establish an E2E M2M session with AE 302. At step 316, AE 308 requests to establish an E2E M2M session with AE 302 by sending a <session> resource CREATE request to CSE 306 that includes AE 302 identifier information as well as AE 308 information that is used by the SMG CSF to establish the session. At step 317, CSE 306 allocates a unique E2E session identifier and session credentials. Session identifiers identify the session while session credentials are used to authenticate and give authorization to participate in the identified session. At step 318, CSE 306 forwards the session establishment request of step 316 to the next hop (which is CSE 304 in this example). The session identifier and session credentials may be included in this forwarded request. At step 319, SMG CSF on CSE 304 receives and processes M2M service session establishment request targeting AE 302.

As continued in FIG. 10B, at step 320, SMG CSF on CSE 304 sends a notification of the M2M service session establishment request to AE 302. CSE 304 includes the session identifier and credentials as well as AE 308 session information in the notification such as AE 308's M2M identifier(s), among other things. This information may be used later by AE 302 to send or receive session-based messages to or from AE 308 via the SMG CSFs on CSE 304 and CSE 306. At step 321, AE 302 returns a positive response to the notification request indicating that it is interested and willing to enter into an M2M service session (i.e., E2E M2M service layer session described above) with AE 308. Included in the response may be session establishment information specified by AE 302 (e.g. AE 302's M2M identifier, resources that it wants to make accessible via the session, etc.). At step 322, the SMG CSF on CSE 304 creates an M2M service <session> resource and <sessionEndpoint> resources for both AE 308 and AE 302 in which it stores session information (e.g. sessionID, endpoint identifiers, etc.). In addition, a <nextHop> resource is also created for CSE 306.

With continued reference to FIG. 10B, at step 323, the SMG CSF on CSE 304 returns a positive response to the M2M service session establishment CREATE request to the SMG CSF on CSE 306. At step 324, the SMG CSF on CSE 306 creates M2M <session> resource and <sessionEndpoint> resources for both AE 308 and AE 302 in which it stores session information (e.g. sessionID, endpoint identifiers, etc.). In addition, a <nextHop> resource is also created for CSE 304. At step 325, SMG CSF on CSE 306 returns a positive response to M2M service session establishment CREATE request of step 316 to AE 308. The response may include session information such as session ID and credentials, among other things. At step 326, AE 308 sends a request to CSE 306 to create a session policy to support a desired level of QoS that it requires for the session (e.g., QoS may be that the message should not be store-and-forwarded). At step 327, SMG CSF on CSE 306 forwards request to next hop SMG CSF on CSE 304. At step 328, SMG CSF on CSE 304 creates <sessionPolicy> resource. At step 329, SMG CSF on CSE 304 returns a positive response to SMG CSF on CSE 306. At step 330, SMG CSF on CSE 306 creates <sessionPolicy> resource. At step 331, SMG CSF on CSE 304 returns a positive response to AE 308.

Figure 11A:
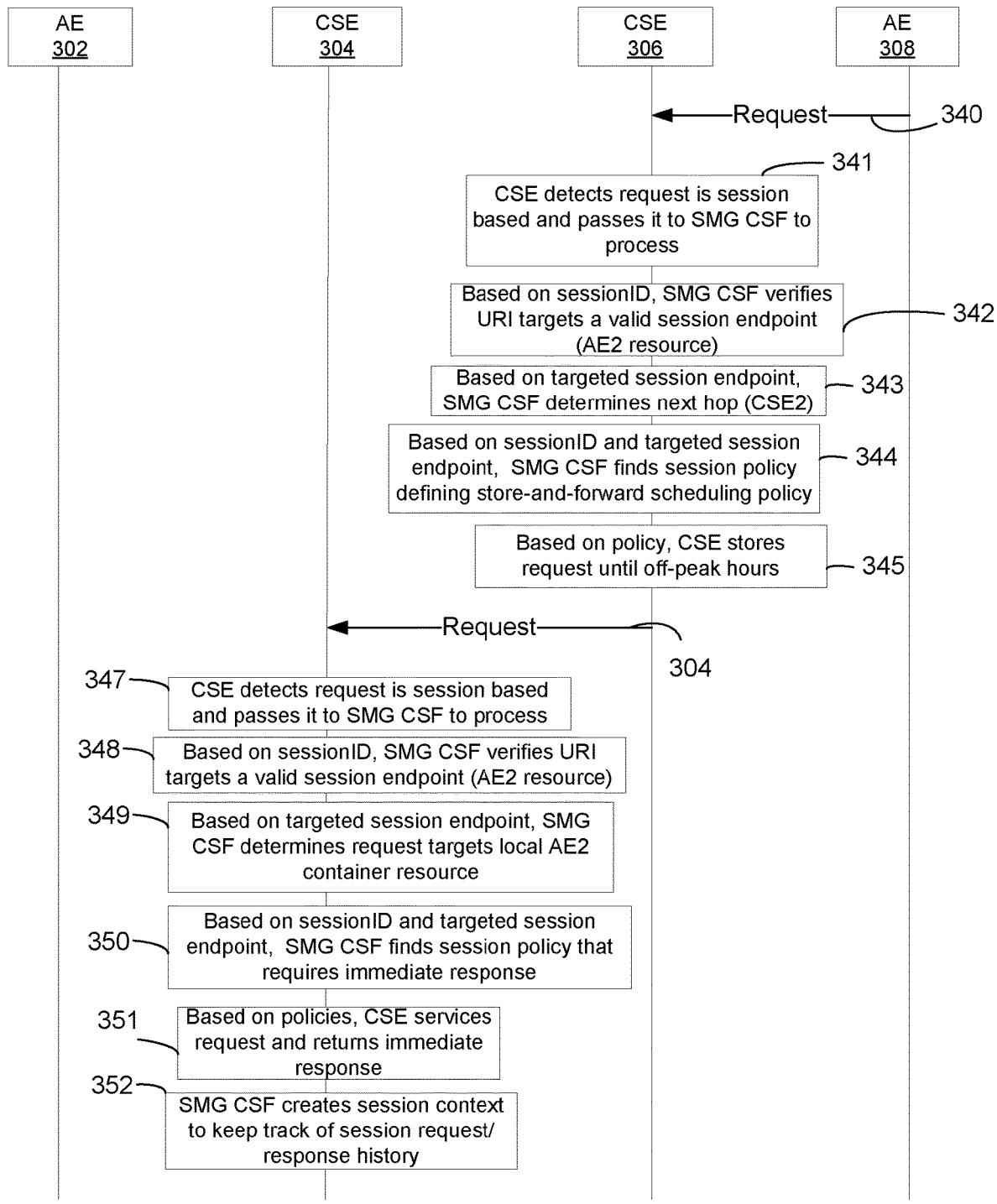
FIG. 11A illustrates a session usage procedure for a oneM2M SMG service.
Figure 11B:
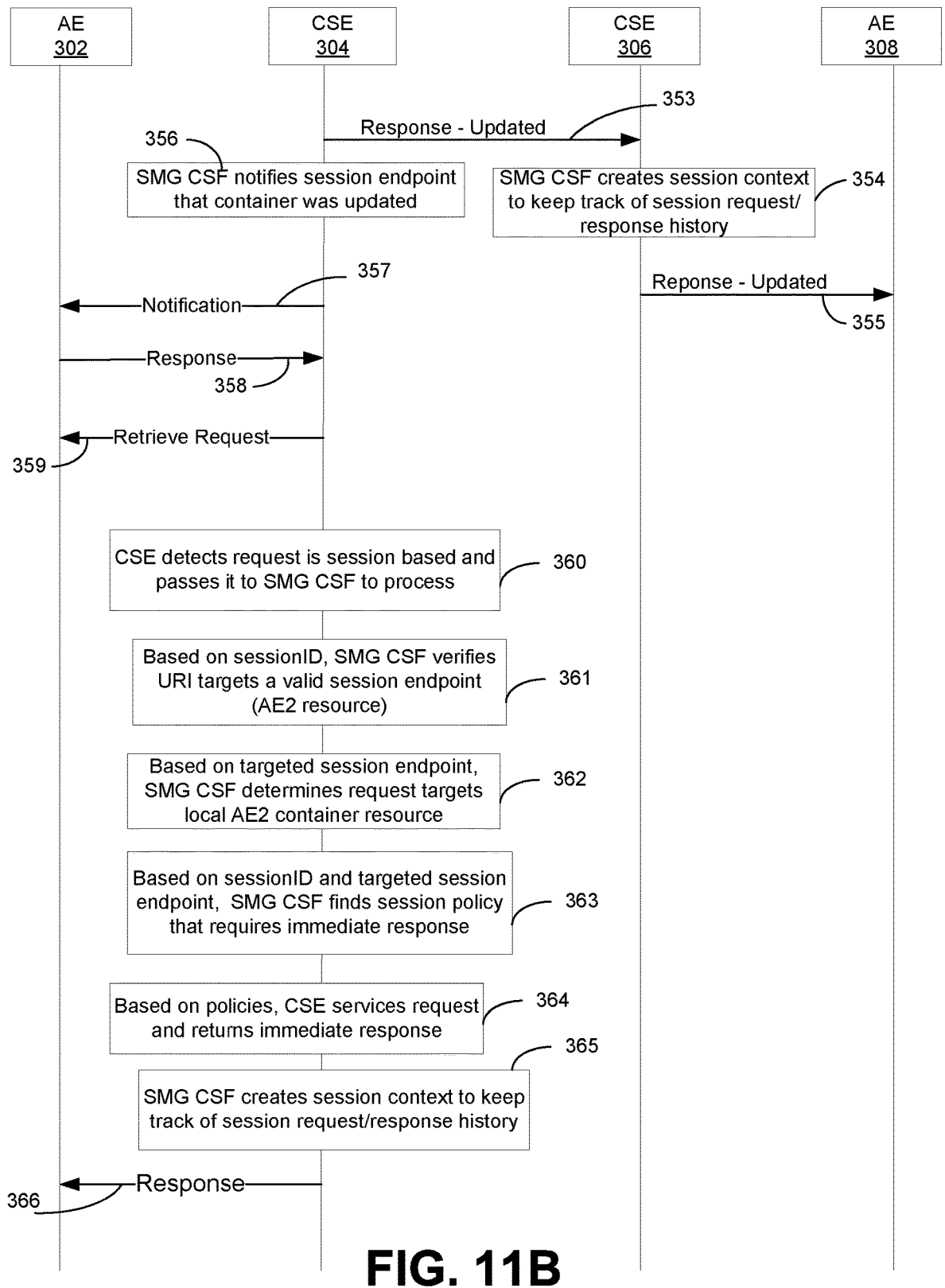
FIG. 11B illustrates a session usage procedure for a oneM2M SMG service continued from FIG. 11A.

FIG. 11A and FIG. 11B illustrate a session usage procedure for a oneM2M SMG service supporting the resources that are defined in more detail below. At step 340, AE 308 sends a service session-based request to CSE 306 to update an AE 302 container resource hosted on CSE 304. At step 341, CSE 306 detects that the request of step 340 is service session based and passes it to SMG CSF to process. At step 342, based on sessionID, SMG CSF on CSE 306 verifies that a received URI targets a valid session endpoint (AE 302's container1 resource). At step 343, based on a targeted session endpoint (i.e., AE 302), SMG CSF on CSE 306 determines next hop is CSE 304. At step 344, based on sessionID and targeted session endpoint (i.e., AE 302), SMG CSF on CSE 306 finds session policy defining store-and-forward scheduling policy. At step 345, based on policy, CSE 306 stores request until off-peak hours and then forwards it to CSE 304 during off-peak hours. At step 346, CSE 306 forwards request to CSE 304. At step 347, CSE 304 detects request is session based and passes it to SMG CSF to process. At step 348, based on sessionID, SMG CSF on CSE 304 verifies a received URI targets a valid session endpoint (AE 302's container1 resource). At step 349, based on targeted session endpoint, SMG CSF on CSE 304 determines request targets local AE 302 container resource. At step 350, based on sessionID and targeted session endpoint, SMG CSF on CSE 304 finds session policy that requires immediate response. At step 351, based on policies, CSE 304 services request and returns a response. At step 352, SMG CSF on CSE 304 creates session context to keep track of session request/response history.

As continued in FIG. 11B, at step 353, CSE 304 sends a response to CSE 306. At step 354, SMG CSF on CSE 306 creates session context to keep track of session request/response history. At step 355, SMG CSF on CSE 306 sends response to AE 308. At step 356, SMG CSF on CSE 304 prepares a notification to session endpoint (AE 302) that container was updated. At step 357, SMG CSF on CSE 304 sends notification to AE 302 that container1 resource was updated as part of the session. At step 358, AE 302 responds with a positive response that it received the notification. At step 359, AE 302 sends a session-based RETRIEVE request to CSE 304 to retrieve updated container resource. At step 360, CSE 304 detects that the request of step 359 is session based and passes it to SMG CSF to process. At step 361, Based on sessionID, SMG CSF on CSE 304 verifies URI targets a valid session endpoint (AE 302's container1 resource). At step 362, Based on targeted session endpoint, SMG CSF on CSE 304 determines that the request targets local AE 302 container1 resource. At step 363, based on sessionID and targeted session endpoint, SMG CSF on CSE 304 finds session policy that requires immediate response. At step 364, based on policies, CSE services request and returns immediate response. At step 365, SMG CSF on CSE 304 creates session context to keep track of session request or response history. At step 366, CSE 304 returns response to AE 302.

Figure 12:
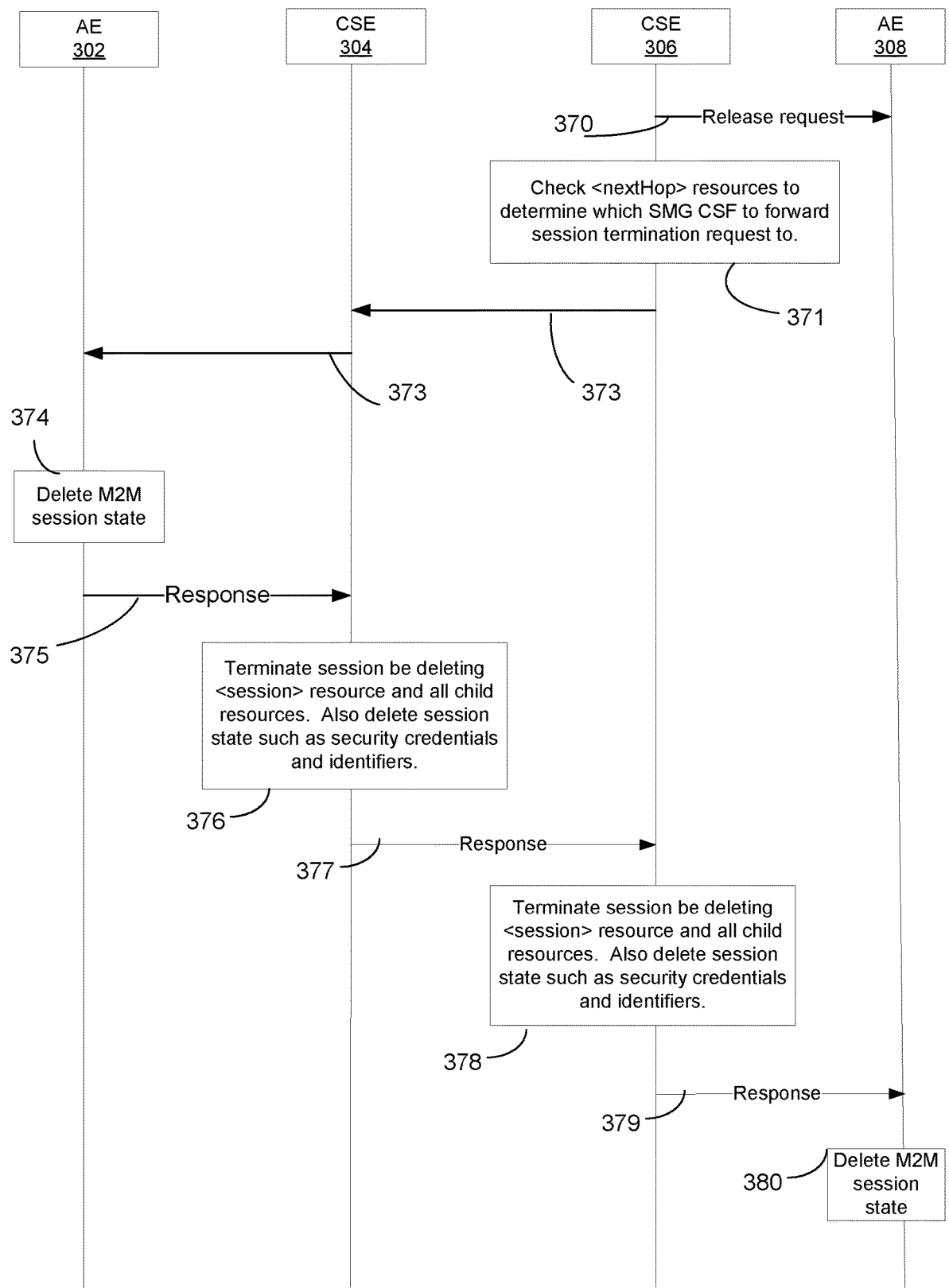
FIG. 12 illustrates an exemplary M2M session termination procedure for a oneM2M SMG service.

FIG. 12 illustrates an exemplary E2E M2M session termination procedure for a oneM2M SMG service supporting the resources defined below. In this example, the session termination is invoked by the session initiator (AE 308). Although not shown in FIG. 12, session termination may also be invoked by other session endpoints, the SMG CSF itself, and other CSFs having proper management rights to do so. At step 370, AE 308 sends an E2E M2M session termination request to CSE 306 using a DELETE.

At step 371 SMG CSF on CSE 306 processes request and determines which next hop SMG CSFs on other CSEs it needs to forward session termination request to such that session state on these CSEs can be torn-down. In this example, SMG CSF on CSE 304 is the next hop detected. At step 372, SMG CSF on CSE 306 forwards session termination request to SMG CSF on CSE 304. At step 373, a CSF on CSE 304 notifies session endpoint (i.e., AE 302) that session is being terminated. At step 374, AE 302 processes notification and deletes locally stored M2M session state. At step 375, AE 302 returns a positive response to the notification request indicating it has removed its local M2M session state. At step 376, SMG CSF on CSE 304 deletes its locally hosted <session> resource and all child resources. The SMG CSF also deletes any local session state such as security credentials and identifiers allocated to the session. At step 377, SMG CSF on CSE 304 returns a positive response to the session termination DELETE request to the SMG CSF on CSE 306. At step 378, SMG CSF on CSE 306 deletes its locally hosted <session> resource and all child resources. The SMG CSF also deletes any local session state such as security credentials and identifiers allocated to the session. At step 379, SMG CSF on CSE 306 returns a positive response to the M2M service session termination DELETE request to AE 308. At step 380, AE 308 deletes stored M2M session state.

It is understood that the entities performing the steps illustrated in FIG. 10A, FIG. 10B, FIG. 11A, FIG. 11B, and FIG. 12 are logical entities that may be implemented in the form of software (i.e., computer-executable instructions)

stored in a memory of, and executing on a processor of, a device, server, or computer system such as those illustrated in FIG. 25C or FIG. 25D. That is, the method(s) illustrated in FIG. 10A, FIG. 10B, FIG. 11A, FIG. 11B, and FIG. 12 may be implemented in the form of software (i.e., computer-executable instructions) stored in a memory of a computing device, such as the device or computer system illustrated in FIG. 25C or FIG. 25D, which computer executable instructions, when executed by a processor of the computing device, perform the steps illustrated in FIG. 10A, FIG. 10B, FIG. 11A, FIG. 11B, and FIG. 12.

Figure 13:
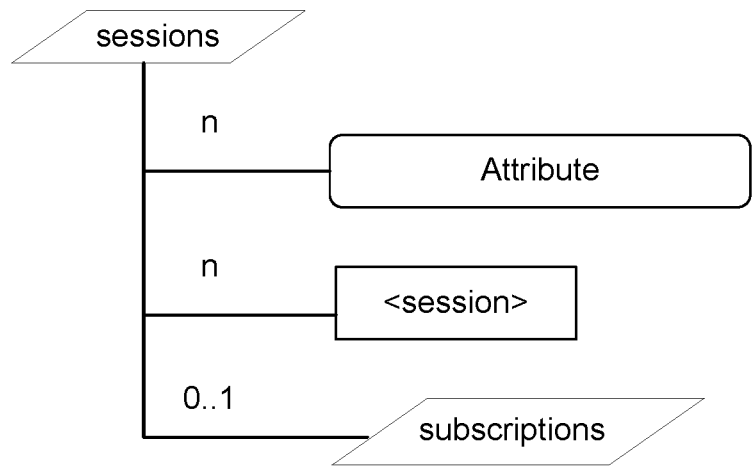
FIG. 13 illustrates a resource "sessions"
Figure 14:
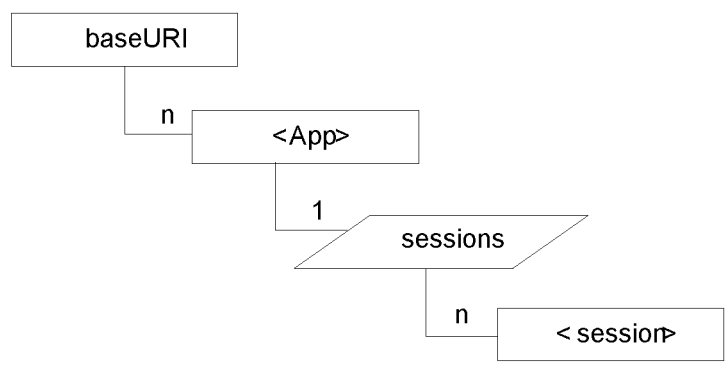
FIG. 14 illustrates sessions resource instantiation under CSE Base URI.
Figure 15:
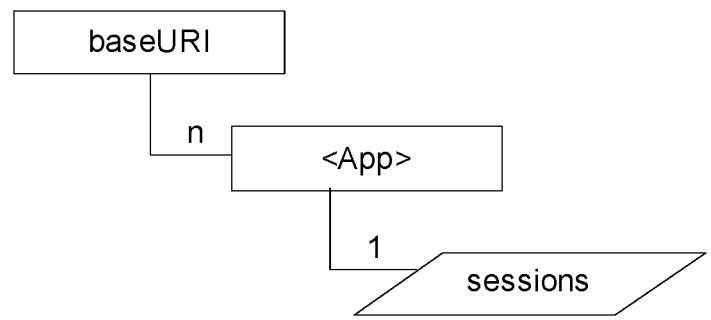
FIG. 15 illustrates sessions resource instantiation under an application resource.

Disclosed below are resource structures (e.g., FIG. 14) for the SMG CSF, which may be used in procedures discussed herein. To assist in the understanding of the resource figures, discussed herein the oneM2M defined graphical representation for describing resource structures is the following: 1) square boxes may be used for resources and child resources; 2) square boxes with round corners may be used for attribute; 3) parallelograms with no right angles (e.g., rhomboids) may be used for collection of resources; 4) the multiplicity of each attribute and child resource is defined; and 5) resource names delimited with "<" and ">" indicate names assigned during the creation of the resource A "sessions" resource can represent a collection of one or more <session> resources, as shown in FIG. 13. Alternatively, <session> resources can be instantiated independently (i.e., outside of a sessions collection resource). This sessions resource can be instantiated at various levels in the oneM2M CSE resource tree hierarchy. The level of instantiation can be indicative of the type of M2M session. Similarly, M2M sessions between M2M applications or between M2M applications and CSEs can be instantiated under an application resource as shown in FIG. 14. For example, M2M sessions between multiple CSEs may be instantiated under a CSE's base URI, as shown in FIG. 15.

The sessions resource may contain child resources according to their multiplicity in Table 1. This resource can contain the attributes according to their multiplicity in Table 2.

TABLE 1

Child Resources of sessions Resource

| Child Resource Name | Child Resource Type | Multiplicity | Description |
|---|---|---|---|
| <session> | M2M service session resource | n | M2M service session resources support attributes and child resources used by the SMG CSF to manage M2M service sessions. |
| subscriptions | Collection of subscription resources | 0 . . . 1 | Used to create subscriptions to sessions collection. |

TABLE 2

Attributes of sessions Resource

| Attribute Name | Multiplicity | Description |
|---|---|---|
| creationTime | 1 | Time of creation of the resource |
| accessRightID | 0 . . . n | URI of an access rights resource |
| lastModifiedTime | 1 | Last modification time of a resource |

Figure 16:
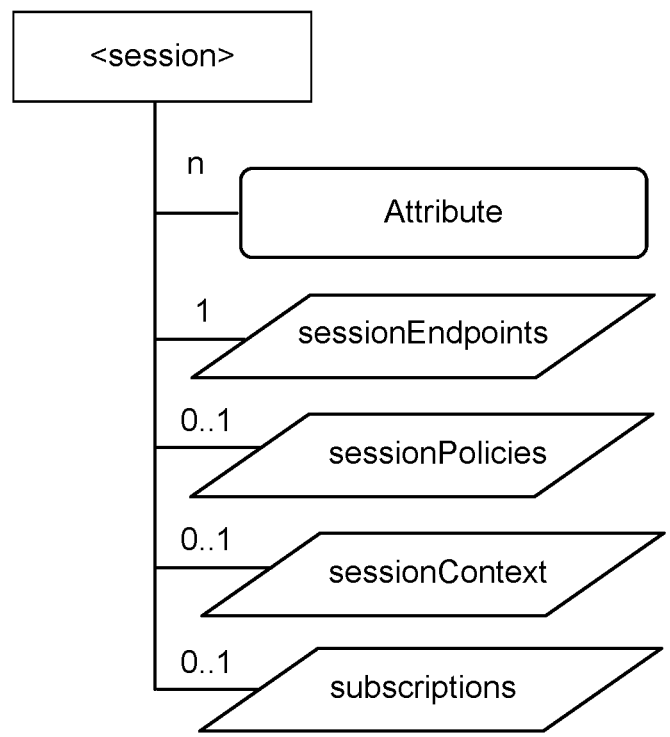
FIG. 16 illustrates a resource <session>.

A <session> resource can contain information used by the SMG CSF for managing a particular M2M service session, as shown in FIG. 16. This resource can contain the child resources according to their multiplicity in Table 3. This resource can contain the attributes according to their multiplicity in Table 4.

TABLE 3

Child Resources of <session> Resource

| Child Resource Name | Child Resource Type | Multiplicity | Description |
|---|---|---|---|
| sessionEndpoints | Collection of <sessionEndpoint> resources | 1 | Collection of M2M service session endpoint resources that support endpoint specific attributes |
| sessionPolicies | Collection of <sessionPolicy> resources | 0 . . . 1 | Collection of M2M service session policy resources that are used by the SMG to manage the M2M service session in a policy based manner |
| sessionContext | Collection of <sessionContextInstance> resources | 0 . . . 1 | Collection of M2M service session context instance resources which store context information related to M2M service session activity and events. |
| subscriptions | Collection of subscription resources | 0 . . . 1 | Used to create subscriptions to a <session> resource. Subscriptions can be used to subscribe to session related events such as additions or updates to session endpoint context. |

TABLE 4

Attributes of <session> Resource

| Attribute Name | Multiplicity | Description |
| --- | --- | --- |
| sessionID | 1 | A unique ID assigned by SMG CSF when <session> resource is created (i.e., M2M service session is established). |
| sessionMode | 1 | The mode that the M2M service session is in. Some examples of different modes include ONLINE and OFFLINE. When a session is in the ONLINE mode, session endpoints can communicate with one another in a session-based manner. When a session is in an OFFLINE mode, session endpoints will not be able to communicate with one another. The SMG CSF as well as the session endpoints can configure this attribute. |
| sessionDescription | 1 | Information (e.g. a string) describing the session. This description can be used to discover an existing session via the CSE resource discovery mechanisms (e.g. by perspective session endpoints). |
| allEndpoints | 1 | Requests targeted towards this attribute URI will be considered for forwarding to all the session endpoints by the SMG CSF. Whether or not the request is forwarded to a particular session endpoint is determined by the SMG CSF checking the trailing portion of the URI that follows "allEndpoints". This portion of the URI path will be compared against each session endpoint's endptPaths attribute. If a match is found, then the request is forwarded towards the session endpoint. Otherwise, the request is not forwarded towards a session endpoint. |
| creationTime | 1 | Time of creation of the resource |
| expirationTime | 1 | Absolute time after which the resource will be deleted by the CSE. This attribute can be provided by the issuer upon resource <session> creation, and in such a case it will be regarded as a hint to the hosting CSE on the lifetime of the resource. expirationTime can be extended by performing an update before expirationTime has elapsed. |
| accessRightID | 1 . . . n | URI of an access rights resource |
| lastModifiedTime | 1 | Last modification time of a resource |

Figure 17:
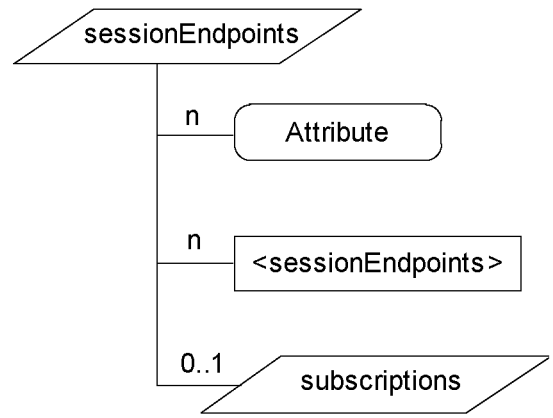
FIG. 17 illustrates a resource sessionEndpoints.

The sessionEndpoints resource can represent a collection of <sessionEndpoint> resources, as shown in FIG. 17. This resource can contain the child resources according to their multiplicity in Table 5. This resource can contain the attributes according to their multiplicity in Table 6.

TABLE 5

Child Resources of sessionEndpoints Resource

| Child Resource Name | Child Resource Type | Multi-plicity | Description |
| --- | --- | --- | --- |
| <sessionEndpoint> | M2M service session endpoint resource | n | M2M service session endpoint resources that support attributes used by the SMG CSF to manage M2M service sessions. |
| subscriptions | Collection of subscription resources | 0 . . . 1 | Used to create subscriptions to sessionEndpoints collection |

TABLE 6

Attributes of sessionEndpoints Resource

| Attribute Name | Multiplicity | Description |
| --- | --- | --- |
| creationTime | 1 | Time of creation of the resource |
| accessRightID | 0 . . . n | URI of an access rights resource |
| lastModifiedTime | 1 | Last modification time of a resource |

Figure 18:
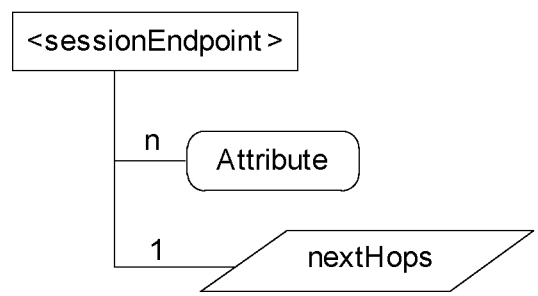
FIG. 18 illustrates a resource <sessionEndpoint>.

The <sessionEndpoint> resource can contain attributes and child resources applicable to a particular M2M service session endpoint, as shown in FIG. 18. This resource can contain the child resources according to their multiplicity in Table 7. This resource can contain the attributes according to their multiplicity in Table 8.

TABLE 7

Child Resources of <sessionEndpoint> Resource

| Child Resource Name | Child Resource Type | Multiplicity | Description |
|---|---|---|---|
| nextHops | Collection of M2M service session next hop resources | n | M2M service session next hop resources support attributes used by the SMG CSF to manage M2M service session hops. |

TABLE 8

Attributes of <sessionEndpoint> Resource

| Attribute Name | Multiplicity | Description |
|---|---|---|
| endptNodeID | 1 | Identifier of M2M node (oneM2M defined M2M-Node-ID) hosting M2M service session endpoint |
| endptID | 1 | Identifier of M2M service session endpoint. Configured with an application identifier (oneM2M defined App-Inst-ID) if session endpoint is an M2M Application. Configured with a CSE identifier (oneM2M defined CSE-ID) if session endpoint is a CSE. |
| endptSubID | 1 | Identifier of M2M Service Provider's service subscription (oneM2M defined M2M-Sub-ID) associated with M2M service session endpoint |
| endptPaths | 0 . . . n | A session endpoint may publish a set of resource paths to restrict the scope of an M2M service session to a particular set of endpoint resources. For example, an M2M service session can be created to only allow session-based communication with a subset of resources hosted on an M2M device. When present, a SMG CSF can compare the URI specified in session-based requests against this URI paths specified in this attribute. If a match is found, then the SMG CSF forwards the request towards the session endpoint. Otherwise, the SMG CSF does not. In the absence of this attribute, the scope of M2M service session endpoint shall not be restricted. Note, accessRights take precedence over this attribute. |
| endptDescription | 1 | Information describing the session endpoint that can be used by perspective session participants to discover session endpoint via CSE resource discovery mechanisms |
| creationTime | 1 | Time of creation of the resource |
| accessRightID | 0 . . . n | URI of an access rights resource. |
| lastModifiedTime | 1 | Last modification time of a resource |

Figure 19:
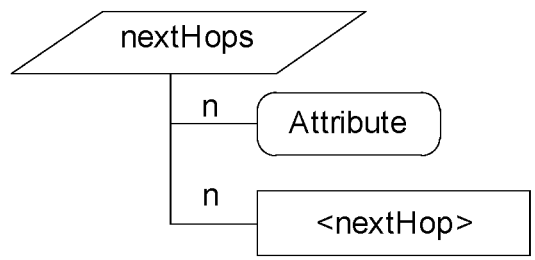
FIG. 19 illustrates a resource nextHops.

The nextHops resource can represent a collection of <nextHop> resources, as shown in FIG. 19. This resource can contain the child resources according to their multiplicity in Table 9. This resource can contain the attributes according to their multiplicity in Table 10.

TABLE 9

Child Resources of nextHops Resource

| Child Resource Name | Child Resource Type | Multiplicity | Description |
|---|---|---|---|
| <nextHop> | M2M service session next hop resource | n | M2M service session next hop resource that supports attributes used by the SMG CSF to keep track of the next hop used to forward session messages to for a particular session endpoint. |

TABLE 10

Attributes of nextHops Resource

| Attribute Name | Multiplicity | Description |
|---|---|---|
| creationTime | 1 | Time of creation of the resource |
| accessRightID | 0 . . . n | URI of an access rights resource. |
| lastModifiedTime | 1 | Last modification time of a resource |

Figure 20:
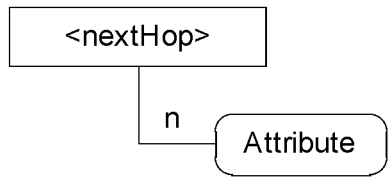
FIG. 20 illustrates a resource <nextHop>.

The <nextHop> resource, as shown in FIG. 20, can contain information regarding the next hop CSE that a SMG CSF forward messages for a specific session endpoint when the M2M session consists of multiple CSE hops in between session endpoints. This resource can be used by the SMG CSF to maintain state of the next hop CSE which session-based requests are forwarded for a given session and/or session endpoint. Maintaining this information can be useful for such operations as tearing down multi-hop M2M sessions spanning across multiple CSEs as well as collaboration between SMG CSFs hosted on different CSEs. This resource can contain the attributes according to their multiplicity in Table 11.

TABLE 11

Attributes of <nextHop> Resource

| Attribute Name | Multiplicity | Description |
|---|---|---|
| nextHopNodeID | 1 | Identifier of a next hop M2M node (oneM2M defined M2M-Node-ID) for targeted M2M service session endpoint |
| nextHopID | 1 | Identifier of the next M2M service session hop. Configured with an application identifier (oneM2M defined App-Inst-ID) if next hop is an M2M Application. Configured with a CSE identifier (oneM2M defined CSE-ID) if next hop is a CSE. |
| nextHopSubID | 1 | Identifier of M2M Service Provider's service subscription (oneM2M defined M2M-Sub-ID) associated with M2M service session next hop. |
| nextHopDescription | 1 | Information describing the session endpoint that can be used by perspective session participants to discover session endpoint via CSE resource discovery mechanisms |
| nextHopState | 0 . . . 1 | Indicates if next hop is currently reachable or not. Next hop's SMG can set this attribute to OFFLINE or ONLINE. Additionally, a CSE can set this attribute to NOT_REACHABLE if it detects a next hop CSE cannot be reached and ONLINE if it detects next hop CSE can be reached. |
| creationTime | 1 | Time of creation of the M2M service session endpoint's next hop resource |
| lastModifiedTime | 1 | Last modification time of M2M service session endpoint's next hop resource |
| accessRightID | 0 . . . 1 | URI of an access rights resource associated with M2M service session endpoint's next hop resource |

Figure 21:
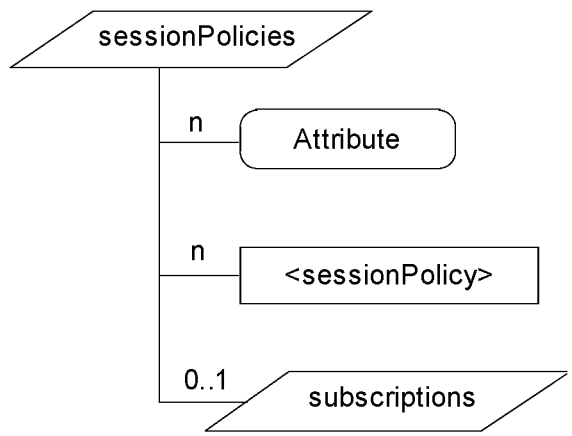
FIG. 21 illustrates a resource sessionPolicies.

The sessionPolicies resource can represent a collection of <sessionPolicy> resources, as shown in FIG. 21. This resource can contain the child resources according to their multiplicity in Table 12. This resource can contain the attributes according to their multiplicity in Table 13.

TABLE 12

Child Resources of sessionPolicies Resource

| Child Resource Name | Child Resource Type | Multi-plicity | Description |
|---|---|---|---|
| <sessionPolicy> | M2M service session policy resource | n | M2M service session policy resource that supports policy related attributes |
| subscriptions | Collection of subscription resources | 0 . . . 1 | Used to create subscriptions to sessionPolicies collection. |

TABLE 13

Attributes of sessionPolicies Resource

| Attribute Name | Multiplicity | Description |
|---|---|---|
| creationTime | 1 | Time of creation of the resource |
| accessRightID | 0 . . . n | URI of an access rights resource. |
| lastModifiedTime | 1 | Last modification time of a resource |

Figure 22:
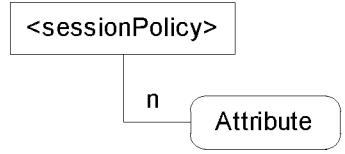
FIG. 22 illustrates a resource <sessionPolicy>.

The <sessionPolicy> resource can contain attributes applicable to a particular M2M service session policy, as shown in FIG. 22. This resource can contain the attributes according to their multiplicity in Table 14.

TABLE 14

Attributes of <sessionPolicy> Resource

| Attribute Name | Multiplicity | Description |
|---|---|---|
| policyType | 1 | The type of policy syntax/language/semantics used to specify the session policy definition. |
| policy | 1 | Session policy definition |
| applicableEndpts | 0 . . . 1 | List of one or more session endpoints that this policy is applicable to. If not specified, than policy is applicable to all session endpoints |

TABLE 14-continued

Attributes of <sessionPolicy> Resource

| Attribute Name | Multiplicity | Description |
| --- | --- | --- |
| creationTime | 1 | Time of creation of the resource |
| accessRightID | 0 . . . n | URI of an access rights resource. |
| lastModifiedTime | 1 | Last modification time of a resource |

Figure 23:
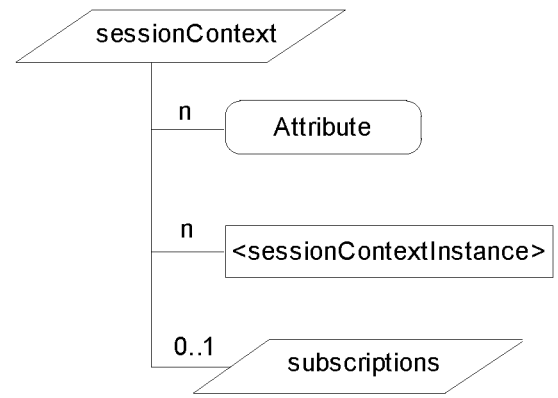
FIG. 23 illustrates a resource sessionContext.

The sessionContext resource can represent a collection of <sessionContextInstances> resources, as shown in FIG. 23. This resource can contain the child resources according to their multiplicity in Table 15. This resource can contain the attributes according to their multiplicity in Table 16.

TABLE 15

Child Resources of sessionContext Resource

| Child Resource Name | Child Resource Type | Multiplicity | Description |
| --- | --- | --- | --- |
| <sessionContextInstance> | M2M service session policy resource | n | M2M service session context instance resource that supports context related attributes |

TABLE 16

Attributes of sessionContext Resource

| Attribute Name | Multiplicity | Description |
| --- | --- | --- |
| creationTime | 1 | Time of creation of the resource |
| accessRightID | 0 . . . n | URI of an access rights resource. |
| lastModifiedTime | 1 | Last modification time of a resource |

Figure 24:
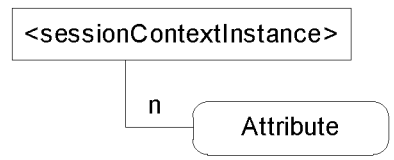
FIG. 24 illustrates a resource <sessionContextInstance>.

The <sessionContextInstance> resource can contain attributes applicable to a particular type of M2M service session context, as shown in FIG. 24. This resource can contain the attributes according to their multiplicity in Table 17.

TABLE 17

Attributes of <sessionContextInstance> Resource

| Attribute Name | Multiplicity | Description |
| --- | --- | --- |
| contextType | 1 | The type of session information to be collected by the SMG CSF and stored within this session context instance (e.g. total number of transactions since session was established, rate of transactions, etc.). |
| container | 1 | URI of container resource where information for this session context instance is stored by SMG CSF. Session context Information can be stored within container's content instance resources. |
| maxNrContentInstances | 1 | Maximum number of content instances of designated container resource used by SMG CSF to store session context information. |
| maxByteSize | 1 | Maximum number of bytes allocated for designated container resource (across all content instances) used by SMG CSF to store session context. |
| maxInstanceAge | 1 | Maximum age of content instances of designated container resource used by SMG CSF to store session context. |
| applicableEndpts | 0 . . . 1 | List of session endpoints that this context shall be collected for. If not specified, than context shall be collected for all session endpoints |
| creationTime | 1 | Time of creation of the resource |
| accessRightID | 0 . . . n | URI of an access rights resource. Must refer to the access right resource. |
| lastModifiedTime | 1 | Last modification time of a resource |

TABLE 15-continued

Child Resources of sessionContext Resource

| Child Resource Name | Child Resource Type | Multiplicity | Description |
| --- | --- | --- | --- |
| subscriptions | Collection of subscription resources | 0 . . . 1 | Used to create subscriptions to sessionContext collection. |

Embodiments set forth herein are described in terms of a representational state transfer (REST) architecture, with components and entities described conforming to the constraints of a REST architecture (RESTful architecture). A RESTful architecture is described in terms of the constraints applied to components, entities, connectors, and data elements used in the architecture rather than in terms of physical component implementation or communications protocols used. Thus, the roles and functions of the components, entities, connectors, and data elements will be described. In a RESTful architecture, representations of uniquely addressable resources are transferred between entities. When handling resources in a RESTful architecture, there are basic methods that may be applied to resources, such as Create (create child resources), Retrieve (read the content of the resource), Update (write the content of the resource) or Delete (delete the resource.) One skilled in the art will recognize that implementations of the instant embodiments may vary while remaining within the scope of the present disclosure. One skilled in the art will also recognize that the disclosed embodiments are not limited to implementations using the oneM2M that is used herein to describe exemplary embodiments. The disclosed embodiments may be implemented in architectures and systems, such as ETSI M2M, and OMA LWM2M, and other related M2M systems and architectures.

FIG. 25A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 25A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 25B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 25B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some embodiments, M2M applications 20 and 20' may include desired applications that communicate using session credentials, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The E2E M2M service layer session of the present application may be implemented as part of a service layer. The service layer is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the E2E M2M service layer session management and other things of the present invention. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the E2E M2M service layer session management and other things of the present application can be implemented as part of an M2M network that uses a Service Oriented Architecture (SOA) and/or a resource-oriented architecture (ROA) to access services such as the session endpoint, session manager, and session credential function, among other things, of the present application.

FIG. 25C is a system diagram of an example M2M device 30, such as an M2M terminal device 18 or an M2M gateway device 14 for example. As shown in FIG. 25C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. This device may be a device that uses the disclosed systems and methods for E2E M2M service layer sessions.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 25C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 25C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to whether the E2E M2M service layer sessions (e.g., session credentialing or session establishment) in some of the embodiments described herein are successful or unsuccessful, or otherwise indicate the status of E2E M2M service layer sessions. In another example, the display may show information with regard to the session state, which is described herein. The current disclosure defines a RESTful user/application API in the oneM2M embodiment. A graphical user interface, which may be shown on the display, may be layered on top of the API to allow a user to interactively establish and manage an E2E session via the underlying service layer session functionality herein.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 25D is a block diagram of an exemplary computing system 90 on which, for example, the M2M service platform 22 of FIG. 25A and FIG. 25B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 25A and FIG. 25B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for service layer session management, the method comprising:
receiving a session request to create a communication session, wherein the session request comprises a first session credential;
determining, based on the session request, a first application, a second application, and at least a first service layer instance for the communication session, the communication session comprising multiple hops;
providing a plurality of session credentials including the first session credential to the first application, the second application, and the at least first service layer instance of the communication session,
wherein the plurality of session credentials are used to provide multi-hop, end-to-end secured communications between the first application and the second application through the at least first service layer instance;

based on the plurality of session credentials, managing the communication session;

maintaining first session state information indicating a description of the communication session, the first session state information comprising at least session endpoint information indicating one or more available session endpoints;

based on the first session state information, supporting discovery of information of the communication session by a third application; and maintaining second session state information indicating current state of the communication session, the second session state information comprising at least a parameter associated with availability of the communication session, wherein the second session state information is considered for supporting the discovery of information of the communication session by the third application.

2. The method of claim 1, wherein, the plurality of session credentials are adapted to allow the first service layer instance to compress and decompress application data of the communication session flowing through the first service layer instance.

3. The method of claim 1, wherein the plurality of session credentials are periodically refreshed based on a lifetime of a respective session credential of the plurality of session credentials.

4. The method of claim 3, wherein the plurality of session credentials are adapted to allow the first service layer instance to encrypt and decrypt application data of the communication session flowing through the first service layer instance.

5. The method of claim 1, further comprising receiving a service layer session response to create a second communication session, wherein the response comprises a list of application identifiers, end-to-end service layer session identifier, or end-to-end service layer session credentials for the second communication session.

6. The method of claim 1, further comprising authenticating the first application with the first service layer instance based on the plurality of session credentials.

7. The method of claim 1, further comprising:
interfacing with one or more other functions in the first service layer instance to provide value-added data services for messages flowing through the at least first service layer instance, the value-added data services comprise whether data of the communication session flowing through the first service layer instance can be aggregated with other data; and
storing a session state of the communication session.

8. The method of claim 1, wherein the first session state information further comprising session endpoint path information indicating a set of resource paths to restrict a scope of session endpoint resources.

9. The method of claim 1, wherein the plurality of session credentials are provisioned to the first application, the second application, and the at least first service layer instance.

10. An apparatus comprising:
a processor; and
a memory coupled with the processor, the memory having stored thereon executable instructions that when executed by the processor cause the processor to effectuate operations comprising:

receiving a session request to create a communication session, wherein the session request comprises a first session credential;

determining, based on the session request, a first application, a second application, and at least a first service layer instance for the communication session, the communication session comprising multiple hops;

providing a plurality of session credentials including the first session credential to the first application, the second application, and the at least first service layer instance of the communication session,
wherein the plurality of session credentials are used to provide multi-hop, end-to-end secured communications between the first application and the second application through the at least first service layer instance;

based on the plurality of session credentials, managing the communication session;

maintaining first session state information indicating a description of the communication session, the first session state information comprising at least session endpoint information indicating one or more available session endpoints;

based on the first session state information, supporting discovery of information of the communication session by a third application; and maintaining second session state information indicating current state of the communication session, the second session state information comprising at least a parameter associated with availability of the communication session, wherein the second session state information is considered for supporting the discovery of information of the communication session by the third application.

11. The apparatus of claim 10, wherein, the plurality of session credentials are adapted to allow the first service layer instance to compress and decompress application data of the communication session flowing through the first service layer instance.

12. The apparatus of claim 10, wherein the plurality of session credentials are periodically refreshed based on a lifetime of a respective session credential of the plurality of session credentials.

13. The apparatus of claim 12, wherein the plurality of session credentials are adapted to allow the first service layer instance to encrypt and decrypt application data of the communication session flowing through the first service layer instance.

14. The apparatus of claim 10, the operations further comprising receiving a service layer session response to create a second communication session, wherein the response comprises a list of application identifiers, end-to-end service layer session identifier, or end-to-end service layer session credentials for the second communication session.

15. The apparatus of claim 10, the operations further comprising authenticating the first application with the first service layer instance based on the plurality of session credentials.

16. The apparatus of claim 10, the operations further comprising storing a session state of the communication session.

17. The apparatus of claim 10, wherein the first session state information further comprising session endpoint path information indicating a set of resource paths to restrict a scope of session endpoint resources.

18. The apparatus of claim 10, wherein the plurality of session credentials are provisioned to the first application, the second application and the at least first service layer instance.

19. A computer readable storage medium that is not a signal comprising computer executable instructions that when executed by a computing device cause said computing device to perform the instructions comprising:
- receiving a session request to create a communication session, wherein the session request comprises a first session credential;
- determining, based on the session request, a first application, a second application, and at least a first service layer instance for the communication session, the communication session comprising multiple hops;
- providing a plurality of session credentials including the first session credential to the first application, the second application, and the at least first service layer instance of the communication session,
  - wherein the plurality of session credentials are used to provide multi-hop, end-to-end secured communications between the first application and the second application through the at least first service layer instance;
- based on the plurality of session credentials, managing the communication session;
- maintaining first session state information indicating a description of the communication session, the first session state information comprising at least session endpoint information indicating one or more available session endpoints;
- based on the first session state information, supporting discovery of information of the communication session by a third application; and
- maintaining second session state information indicating current state of the communication session, the second session state information comprising at least a parameter associated with availability of the communication session, wherein the second session state information is considered for supporting the discovery of information of the communication session by the third application.

20. The computer readable storage medium of claim 19, wherein the first session state information further comprising session endpoint path information indicating a set of resource paths to restrict a scope of session endpoint resources.

* * * * *